(12) United States Patent
Miyawaki et al.

(10) Patent No.: US 7,674,573 B2
(45) Date of Patent: Mar. 9, 2010

(54) METHOD FOR MANUFACTURING LAYERED PERIODIC STRUCTURES

(75) Inventors: Mamoru Miyawaki, Irvine, CA (US); Jiang-Rong Cao, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 11/500,321

(22) Filed: Aug. 8, 2006

(65) Prior Publication Data
US 2008/0038852 A1 Feb. 14, 2008

(51) Int. Cl.
*H01L 21/00* (2006.01)
*G02B 6/10* (2006.01)

(52) U.S. Cl. .................. 430/321; 430/1; 430/2

(58) Field of Classification Search .......... None
See application file for complete search history.

(56) References Cited

U.S. PATENT DOCUMENTS

| | | | |
|---|---|---|---|
| 3,875,026 A * | 4/1975 | Widmer ................. | 205/50 |
| 5,998,298 A * | 12/1999 | Fleming et al. ........ | 438/692 |
| 6,583,350 B1 * | 6/2003 | Gee et al. .............. | 136/253 |
| 7,462,873 B2 * | 12/2008 | Hoshi et al. ............ | 257/88 |
| 2005/0013541 A1 * | 1/2005 | Kittaka et al. .......... | 385/37 |
| 2005/0179995 A1 * | 8/2005 | Nikolov et al. .......... | 359/359 |
| 2006/0202187 A1 * | 9/2006 | Govyadinov et al. .... | 257/3 |

FOREIGN PATENT DOCUMENTS

JP 10-073722 * 3/1998

OTHER PUBLICATIONS

Feiertag et al., "Fabrication of photonic crystals by deep X-ray lithography", Appl. Phys. Lett. vol. 71(11) pp. 1441-1443 (Sep. 1997).*
Zaidi et al. "Optical properties of nanoscale, one dimensional silicon grating structures", J. Appl Phys vol. 80(12) pp. 6997-7008 (Dec. 1996).*
Weissbuch et al. "Advances in photonic crystals" Phys. Stat. Sol. b vol. 221 pp. 93-99 (2000).*
Lin et al., "Three dimensional photonic crystal emitter for thermal photovoltaic power generation", Appl. Phys. Lett., vol. 82(2) pp. 380-382 (Jul. 2003).*

* cited by examiner

*Primary Examiner*—Martin J Angebranndt
(74) *Attorney, Agent, or Firm*—Fitzpatrick, Cella, Harper & Scinto

(57) ABSTRACT

A method of manufacturing a periodic grating structure for a component. The method includes forming first structured layer including a final periodic grating structure of a first material and a second material filling spaces between individual features of the final periodic grating structure, removing the second material using a first chemical process and annealing a portion of the first material into a third material using a second chemical process.

18 Claims, 28 Drawing Sheets

METHOD FOR MANUFACTURING LAYERED PERIODIC STRUCTURES

BACKGROUND

1. Field of the Invention

The present invention pertains generally to manufacturing devices with nanometer scaled features and more specifically to manufacturing components for a Polarization Beam Splitter (PBS).

2. Description of the Related Art

PBSs have been created having a multilayer polarization splitting elements. The multilayer polarization splitting elements are composed of layers having a high refractive index alternating with layers having a low refractive index. These multilayer polarization splitting elements are constructed using $TiO_2$. Such a PBS is described in U.S. application Ser. No. 11/122,153 entitled "POLARIZATION ELEMENT AND OPTICAL DEVICE USING POLARIZATION ELEMENT" filed May 3, 2005.

FIG. 1 is a structural view showing a PBS. FIG. 1 shows a state in which a polarization splitting layer 23 composed of a plurality of periodic structures each having structural birefringence is sandwiched by two prisms. The polarization splitting layer 23 and the two prisms compose an optical element having a polarization splitting function.

In FIG. 1, the polarization splitting layer 23 is tilted at Brewster angle relative to an incident surface 25 of the prism. When an incident light beam including a P-polarized light component 18 and an S-polarized light component 20 is perpendicularly made incident on the incident surface 25, the P-polarized light component 18 passes through the polarization splitting layer 23 to become passing light 19, and the S-polarized light component 20 is reflected on the polarization splitting layer 23 to become reflective light 21. As illustrated herein, the optical element is assumed to be used for visible light.

FIG. 2 is a conceptual view showing the polarization splitting layer 23. The polarization splitting layer 23 has a plurality of grating structures (periodic structures) stacked therein. Periodic directions of adjacent grating structures are substantially orthogonal to each other. In this embodiment, five one-dimensional grating structures corresponding to five layers are stacked. (FIG. 2 is the conceptual view so only three one-dimensional grating structures are shown therein.) Assume that first, second, third, fourth, and fifth one-dimensional gratings are arranged in order from a light incident side (upper side of FIG. 2). A period of each of the grating structures is shorter than a wavelength of any incident light. Each of the grating structures exhibits structural birefringence.

As shown in FIG. 2, an incident surface on which the incident light beam (P-polarized light component 18 and S-polarized light component 20) is made incident is orthogonal to a periodic direction of the first one-dimensional grating. The periodic direction of the first one-dimensional grating is assumed to be a grating direction V. As shown in FIG. 2, a periodic direction of the second one-dimensional grating is orthogonal to the grating direction V and assumed to be a grating direction P.

When the light is made incident on the polarization splitting layer 23, the S-polarized light component is reflected thereon and the reflective light 21 thereof exits from an exit surface 26 different from the incident surface 25 located on the light incident side of the prism. At this time, the P-polarized light component passes through the polarization splitting layer 23 and the passing light 19 thereof exits from an exit surface 27 located on the light exit side of the prism.

This PBS performs well as it has a performance such as wide incident angle as well as broad wavelength. But, it is difficult to make such a device. One difficulty is lies in getting high refractive index material incorporated into the polarization splitting layer. Another difficulty arises when the orthogonal gratings are stacked as it is difficult to stack the gratings stably. Usually one can use etch stop layers to make such gratings in a Si based semiconductor manufacturing process, when one is not concerned with optical properties. However, in the case of a PBS, optical properties are important and the remaining etch stop layers adversely affect the PBS's optical properties.

Therefore, a need exists for a manufacturing process that allows the use of different grating materials, reduces the amount of stop layer material, provides support for the gratings during the manufacturing process, and utilizes low cost batch fabrication techniques. Various aspects and embodiments of the present invention meet such a need.

SUMMARY OF THE INVENTION

In one aspect of the invention, a method of manufacturing a periodic grating structure for a component is provided. The method includes forming a structured layer comprising a final periodic grating structure of a first material and a second material filling spaces between individual features of the final periodic grating structure, removing the second material using a first chemical process and annealing at least a portion of the first material into a third material using a second chemical process.

In another aspect of the invention, the second chemical process may be either oxidation or nitridation.

In another aspect of the invention, a plurality of structured layers are formed. The structured layers are formed by forming a first structured layer and forming a second structured layer separated from the first structured layer by an additional substrate layer of the second material.

In another aspect of the invention, a nitridation level of the first material is lower than the nitridation level of the third material.

In another aspect of the invention, the first structured layer is bonded at a surface to a surface of an additional layer of a fourth material.

In another aspect of the invention, forming a structured layer includes providing a sacrificial layer of the second material on a bottom surface which is composed of the substrate layer or an isolation layer, forming a pattern in the sacrificial layer, the pattern comprising one or more openings extending from a surface of the sacrificial layer to the bottom of the sacrificial layer, filling the pattern with the first material, and removing the sacrificial layer.

In another aspect of the invention, a method of manufacturing a structure for a component includes forming a transitional material layer, patterning the transitional material layer, filling a sacrificial layer in spaces of the patterned transitional material layer, forming an isolation layer, forming a second transitional material layer, patterning the second transitional material layer, removing the first and second sacrificial layers using a first chemical process and annealing a portion of the transitional material in the component to a final material using a second chemical process.

In another aspect of the invention, a method of manufacturing a component having a plurality of structured layers includes putting a plurality of structured layers of a transitional material on transparent substrate, bonding the plurality of structured layers to the transparent substrate and annealing the transitional material of the structured layers into a final material.

BRIEF DESCRIPTION OF THE DRAWINGS

The present invention will be more readily understood from a detailed description of the preferred embodiment taken in conjunction with the following figures.

DETAILED DESCRIPTION

Figure 1:
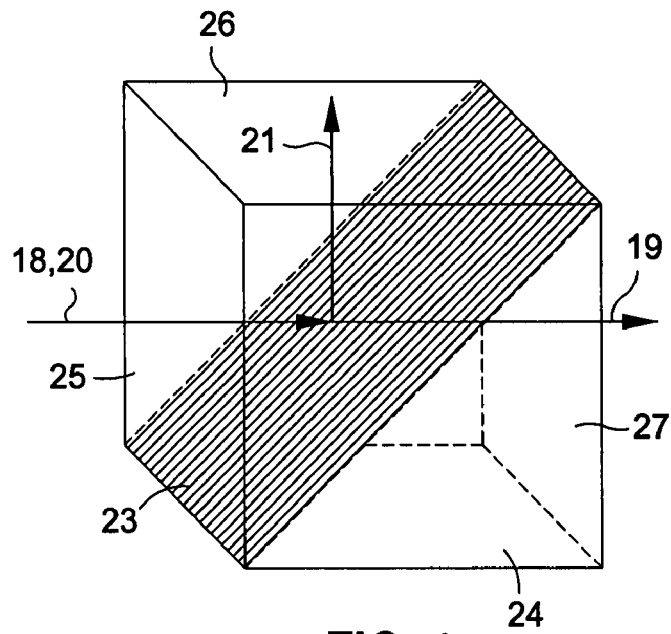
FIG. 1 is a schematic view showing a polarization splitting element.

As previously described, FIG. 1 is a structural view showing a polarization splitting element. FIG. 1 shows a state in which a polarization splitting layer 23 composed of a plurality of periodic structures each having structural birefringence is sandwiched by two prisms. The polarization splitting layer 23 and the two prisms compose an optical element having a polarization splitting function.

Figure 2:
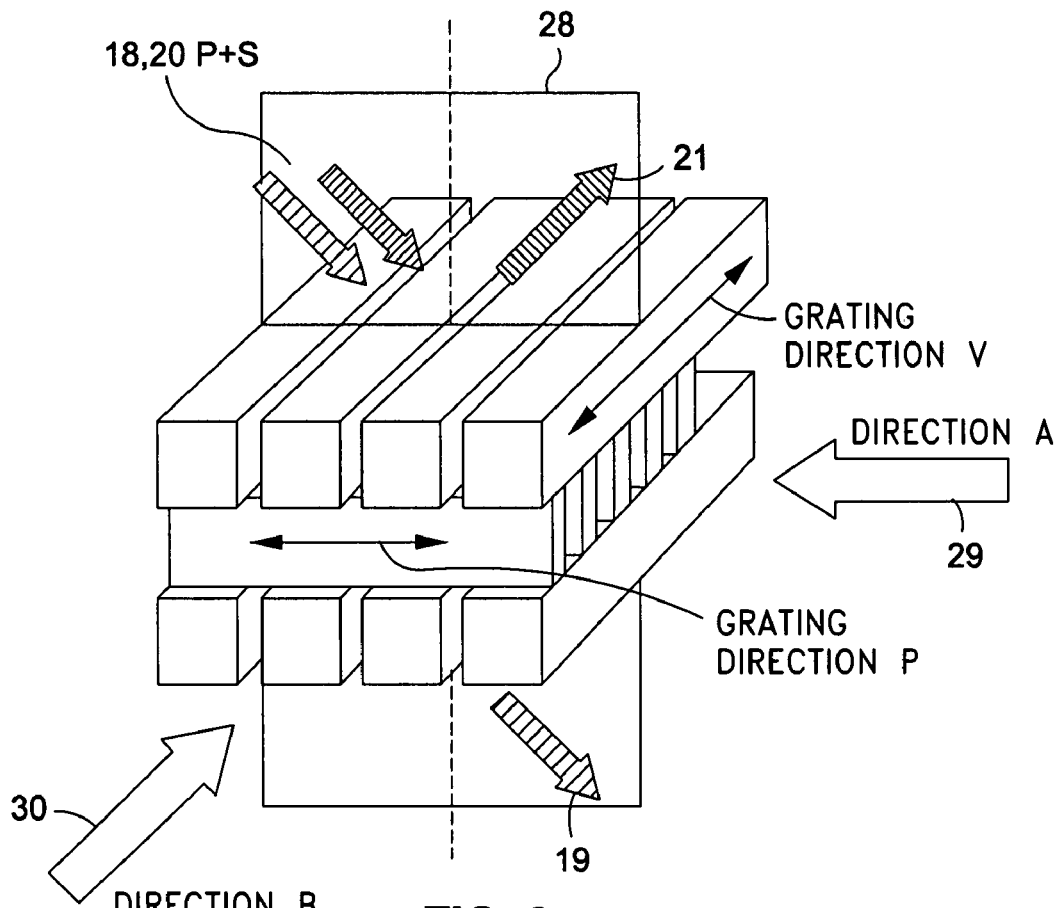
FIG. 2 is a schematic view of a polarization splitting layer.

FIG. 2 is a conceptual view showing the polarization splitting layer 23. The polarization splitting layer 23 has a plurality of grating structures (periodic structures) stacked therein. Periodic directions of adjacent grating structures are substantially orthogonal to each other. In this embodiment, five one-dimensional grating structures corresponding to five layers are stacked. (FIG. 2 is the conceptual view, so only three one-dimensional grating structures are shown therein.) Assume that first, second, third, fourth, and fifth one-dimensional gratings are arranged in order from a light incident side (upper side of FIG. 2). A period of each of the grating structures is shorter than a wavelength of any incident light.

A complete description of the polarization splitting layer 23, the element incorporating the polarization splitting layer and several embodiments is provided in co-pending U.S. application Ser. No. 11/122,153 entitled "POLARIZATION ELEMENT AND OPTICAL DEVICE USING POLARIZATION ELEMENT" filed May 3, 2005, the contents of which are incorporated by reference as if stated in full herein.

While the following description applies specifically to formation of gratings for a polarization splitting layer, such as polarization splitting layer 23, various embodiments of the manufacturing processes disclosed herein are applicable to forming periodic or aperiodic structures for components for other optical and RF applications. For example, a stacked grating structure could be used for filters for specific RF frequencies, detectors, couplers; or for telecommunication applications such as waveguides, lasers, detectors, modulators, multiplexers or demultiplexers. Stacked structures created according to the following descriptions may also be used in optical imaging devices such as a the described PBS, polarizers, diffraction elements for antireflection coatings, and a chromatic aberration correction lens and for use in optical memories such as a DVD or CD, or an optical head.

Figure 3:
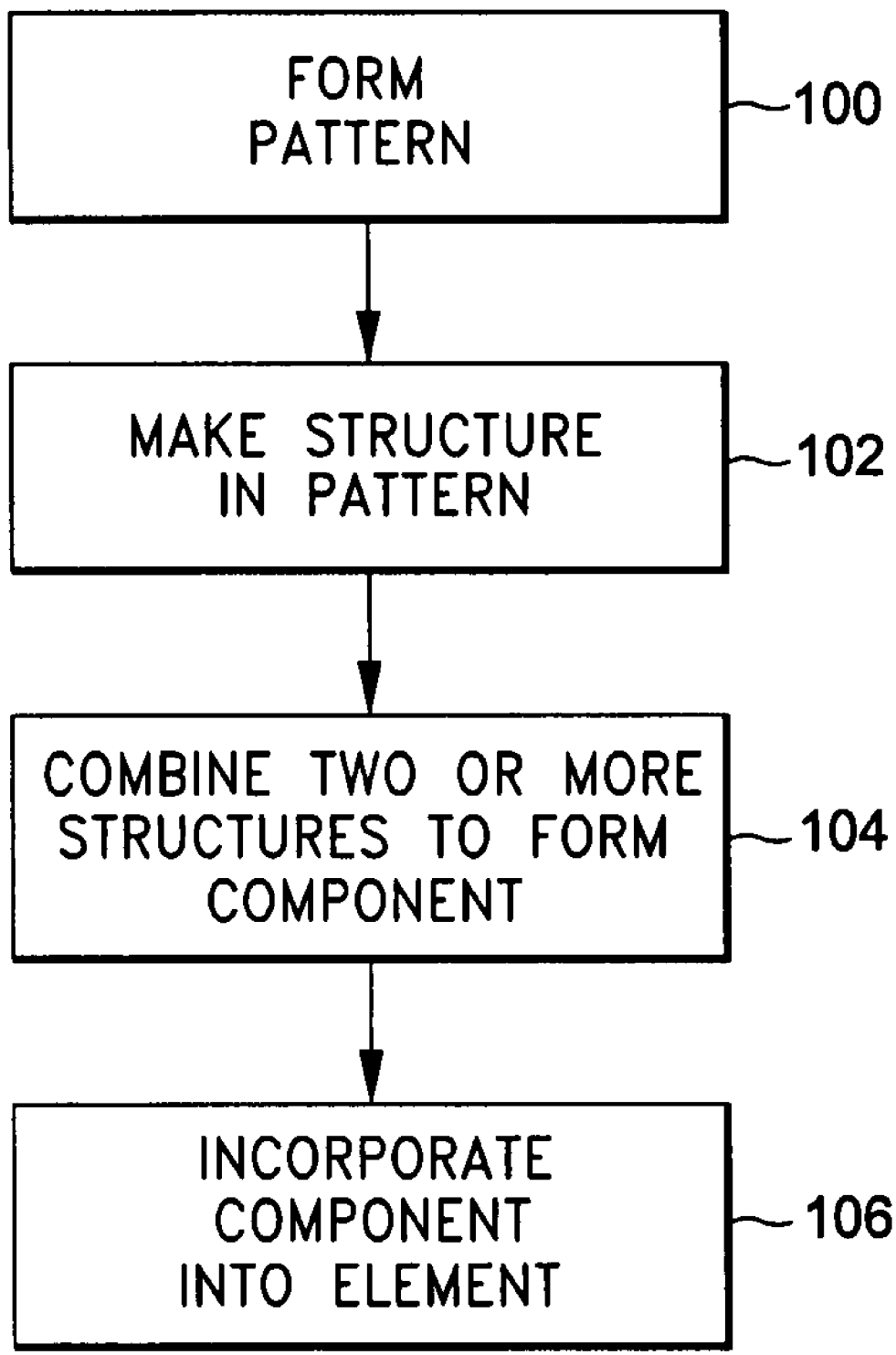
FIG. 3 is a process flow diagram of a manufacturing process in accordance with an exemplary embodiment of the present invention.

FIG. 3 is a process flow diagram of a manufacturing process for manufacturing structures similar to the polarization splitting layer 23. The structures are created by forming one or more gratings in structured layers out of a transitional material. The transitional material is then annealed into the final or desired material for the gratings. The first step of the process is forming (100) a pattern which will serve to direct formation of a structure. The second step is making (102) the structure based on the pattern. Next, two or more structures are combined (104) to form a component of an element. Finally, the component is incorporated (106) in the element.

Figure 4:
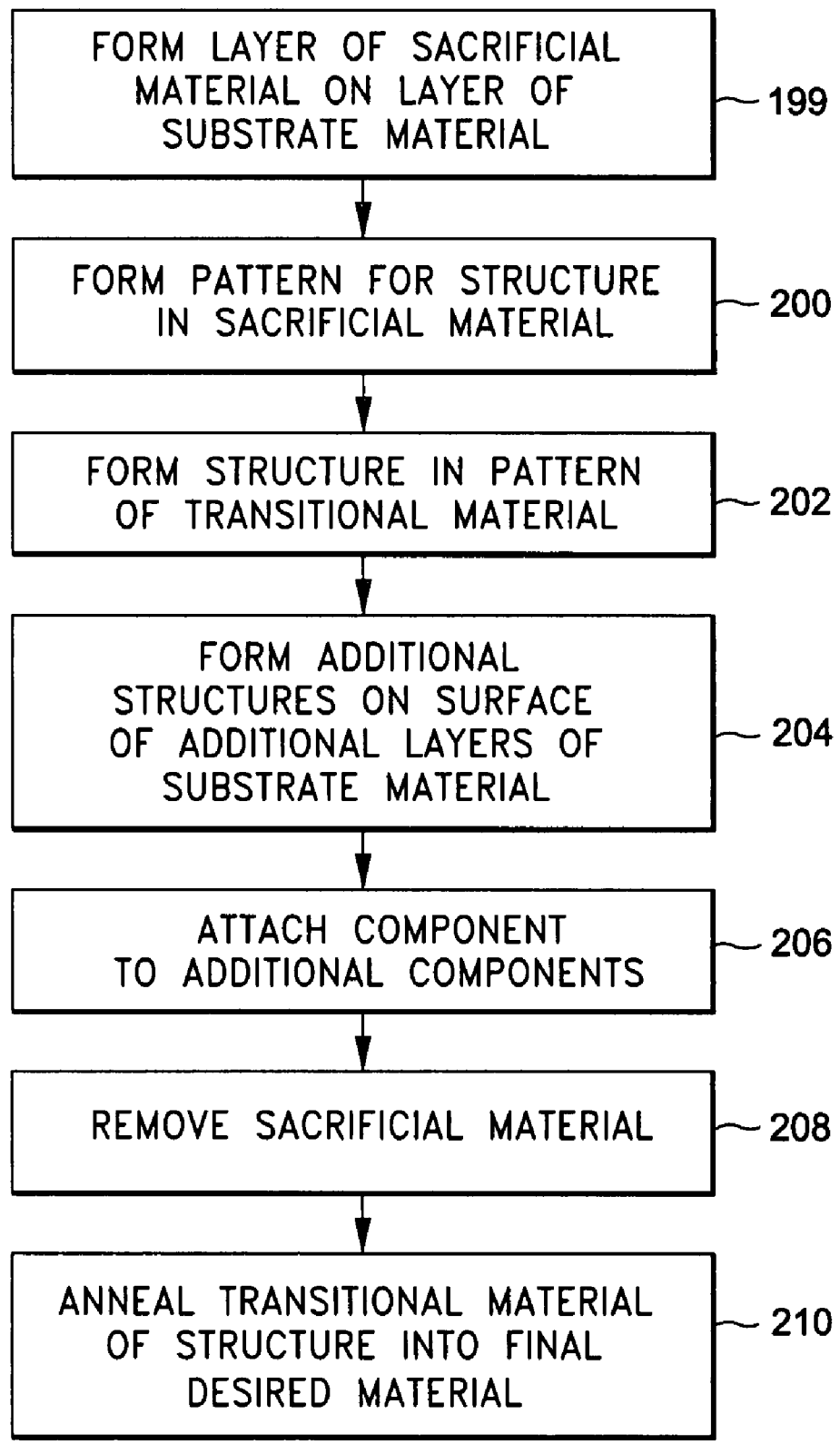
FIG. 4 is a process flow diagram of a manufacturing process in accordance with an exemplary embodiment of the present invention.

In slightly more detail, FIG. 4 is a process flow diagram of a manufacturing process in accordance with an exemplary embodiment of the present invention. During the process, a pattern is formed (200) in a sacrificial material for a structure (such as a single periodic structure for the polarization splitting layer 23 of FIG. 2.) Once the pattern is formed, the structure is formed (202) by filling the pattern with a transitional material. This results in a structure where spaces between individual features of the structure are filled with the sacrificial material. Additional structures may then be formed (204) on top of the first structure by depositing an isolation layer and then forming the additional structure on a surface of the isolation layer for as many layers as needed to form a component for an element (such as the polarization splitting layer 23 of FIG. 2.) Once the component is complete, the component is attached (206) to a substrate and the sacrificial materials are removed (208). After the sacrificial material is removed, the transitional material is annealed (210) to form the final or desired material of the component.

Figure 5A:
FIGS. 5a to 5e illustrate patterning a layer of substrate material in accordance with an exemplary embodiment of the present invention.
Figure 5B:
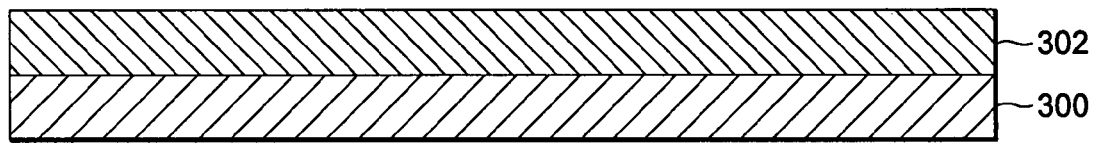
Figure 5C:
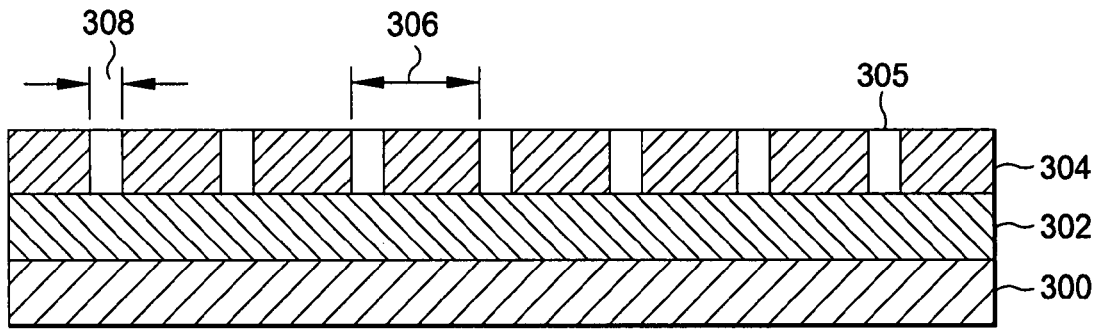

Having described a manufacturing process in accordance with an exemplary embodiment of the present invention, the pattern forming step of the manufacturing process will now be described in additional detail with reference to FIGS. 5a to 5e. FIG. 5a is a cross sectional view of a layer of substrate material 300. As illustrated in FIG. 5b, a sacrificial layer 302 of sacrificial material is formed on a surface of the substrate layer 300. As illustrated in FIG. 5c, a resist layer 304 is formed on a surface of the sacrificial layer 302. The resist layer 304 includes openings, such as opening 305, extending through the resist layer 304 to expose portions of the surface of the sacrificial layer 302. The openings may define a periodic pattern. The pattern may be formed in the resist layer by several methods including lithography by phase shift mask, interference lithography using multiple laser beams or an imprint process.

In a resist layer in accordance with an exemplary embodiment of the present invention, the openings extend along one surface dimension of the resist layer 304 creating a line hole pattern of spaced apart grooves. Such a line hole pattern is useful for creating periodic gratings and the like.

In a resist layer in accordance with an exemplary embodiment of the present invention, the openings are in the range of 30 nm (308) wide with a spacing in the range of 140 nm (306). The height of the sacrificial layer is the range of 400 nm. These dimensions are representative of grating dimensions for a component for a PBS for visible wavelengths. As can be readily understood by those skilled in the art, the pitch depends on the wavelength. For example, in the case of infrared applications, the pitch might be larger than that of the above example in proportion to wavelength.

Figure 5D:
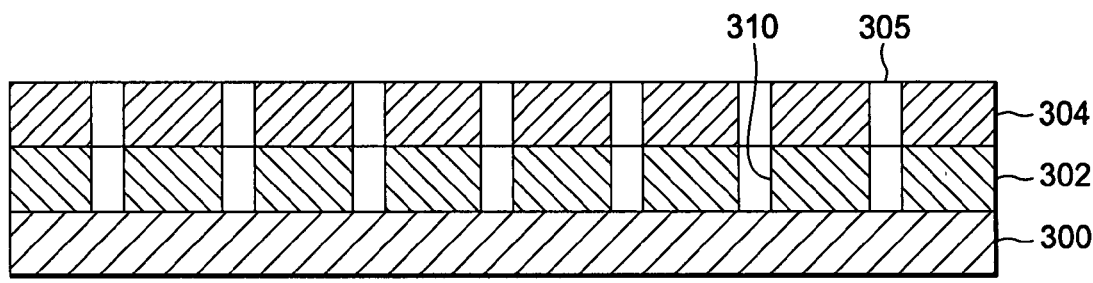

FIG. 5d illustrates forming a pattern in the sacrificial layer 302. The pattern includes one or more openings, such as opening 310, extending substantially from the surface of the resist layer to substrate layer 300. In a manufacturing process in accordance with an exemplary embodiment of the present invention, the sacrificial layer 302 is composed of $SiO_2$ formed by CVD, the substrate layer 300 is composed of Si and the pattern in the sacrificial layer 302 is formed by a dry etching process such as Reactive Ion Etching (RIE) through the openings 305 in the resist layer 304. In this manufacturing process, the Si layer is prepared as an etch stopping layer to avoid any damage to the Si surface of the substrate layer 300. Accordingly, conventional enchants used in Si Large-Scale Integration (LSI) processes to etch by high selectivity such as $CF_4+H_2$, $C_2F_6$, $CHF_3$, and $C_3F_8$.

In another manufacturing process in accordance with an exemplary embodiment of the present invention, if the width of an opening in a pattern is too large in comparison with the design value, additional $SiO_2$ may be deposited in the opening by Chemical Vapor Deposition (CVD) and directional etching is performed by RIE continuously. In this way, the width of a line hole pattern may be adjusted.

In another manufacturing process in accordance with the present invention, a resist reflow process is used to form a smaller hole pattern.

Figure 5E:
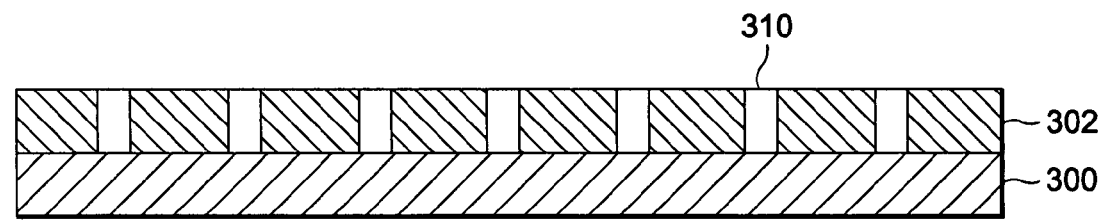

FIG. 5e illustrates removing the resist layer 304 from the surface of the sacrificial layer 302. At this point in the manufacturing process, the sacrificial layer 302 is left with a pattern created by one or more openings, such as opening 310, extending from a surface of the sacrificial layer 302 to essentially a surface of the substrate layer 300.

Figure 6A:
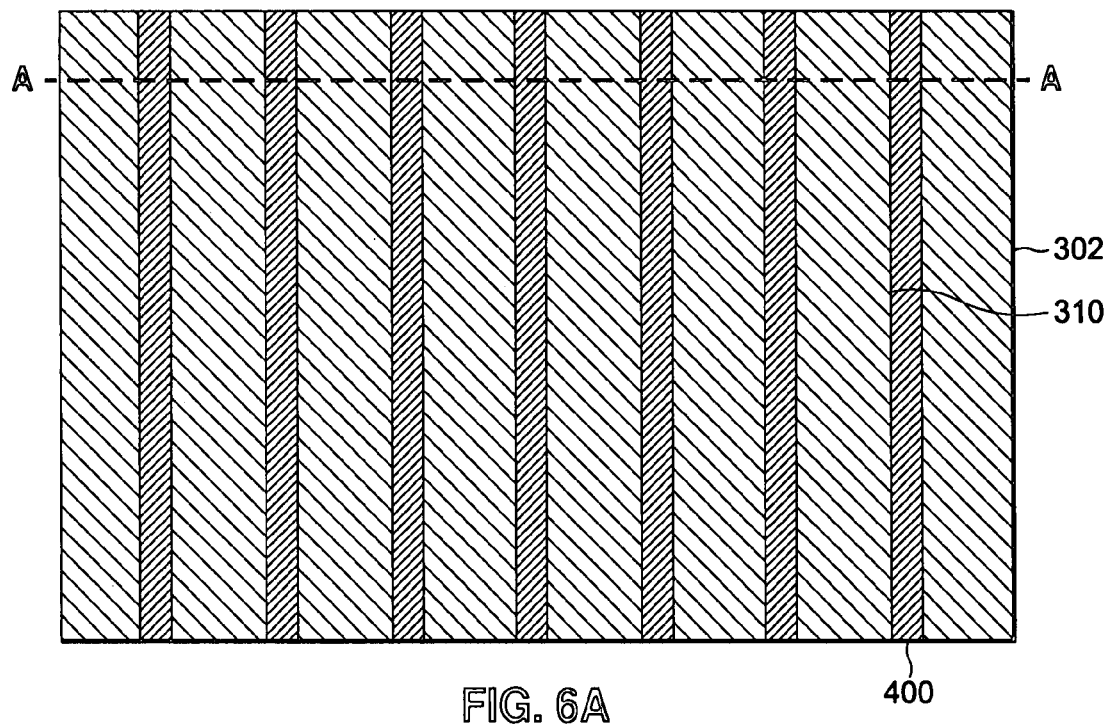
FIGS. 6a and 6b illustrate filling a pattern in accordance with an exemplary embodiment of the present invention.
Figure 6B:
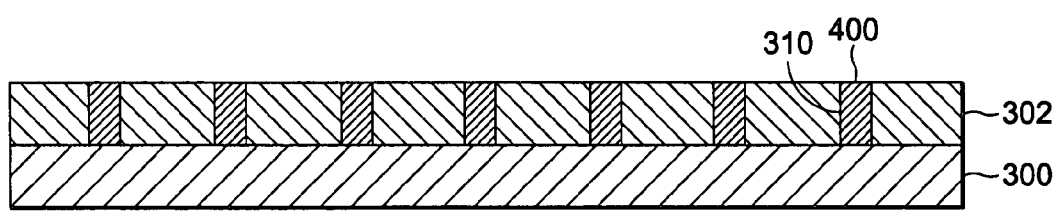

Having described how a pattern may be formed in a sacrificial material in accordance with an exemplary embodiment of the present invention, formation of a structure in the pattern in accordance with an exemplary embodiment of the manufacturing process will now be described with reference to FIGS. 6a and 6b. FIG. 6a is a top view of the sacrificial layer 302 formed on the substrate layer 300, with a pattern formed in the sacrificial layer 302 by one or more openings, such as opening 310. FIG. 6b is a cross-sectional view, taken along the dotted line AA, of the sacrificial layer 302 and substrate layer 300. In each of the views, a structure has been formed in the pattern by introduction of a transitional material 400 in the openings of the pattern formed in the sacrificial layer 302. Therefore, the structure is composed of individual spaced apart features with sacrificial material filling the spaces between the features.

In one embodiment of the manufacturing process, the transitional material is Al and the substrate material is Si. As such, Al will be deposited into the line hole pattern selectively on only an electron dominant surface such as a surface of the exposed Si substrate layer. As an example of process conditions, the background vacuum level should be around $10^{-8}$ Torr, H gas is flowed over the surface of the pattern at 0.7 Torr and the temperature on the substrate layer is held to around 170 C. Then, a plasma is generated at 13.56 MHz using a power level of 0.2 W/cm2. Trimethyl Aluminum (TMA) is introduced at a partial pressure $1.5E^{-4}$ Torr.

Figure 7A:
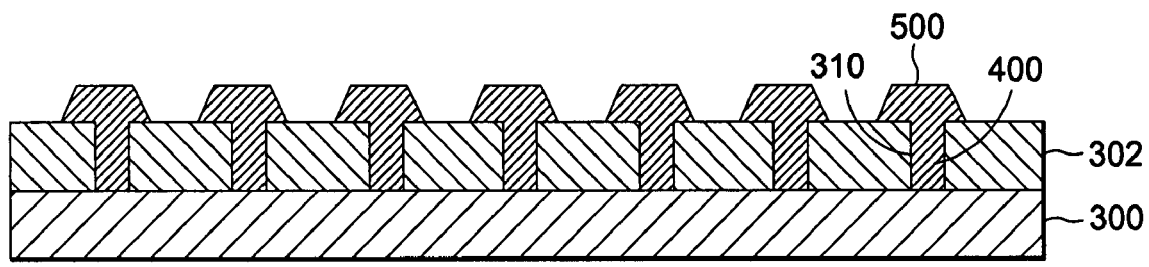
FIGS. 7a and 7b illustrate removing excess fill material in accordance with an exemplary embodiment of the present invention.
Figure 7B:
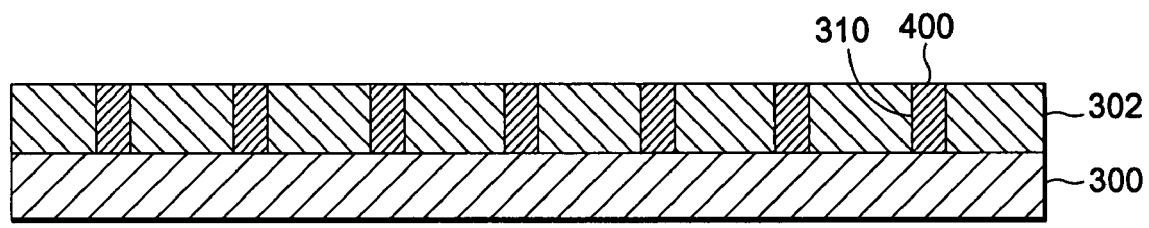

Referring now to FIGS. 7a and 7b, introduction of the transitional material 400 in the pattern in the sacrificial layer 302 should be stopped at the edge of the surface of the sacrificial layer 302, but in the case of over-growth 500 the surface can be polished flat as shown in FIG. 7b by CMP (Chemical Mechanical Polishing). In this process, polishing can be stopped at the surface of sacrificial layer as shown in FIG. 7b.

Figure 8:
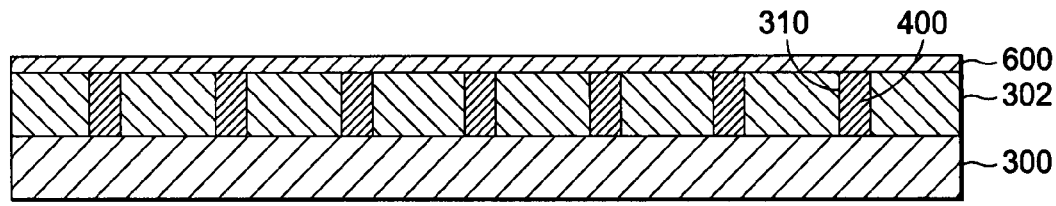
FIG. 8 illustrates application of an additional layer of substrate material in accordance with an exemplary embodiment of the present invention.
Figure 9A:
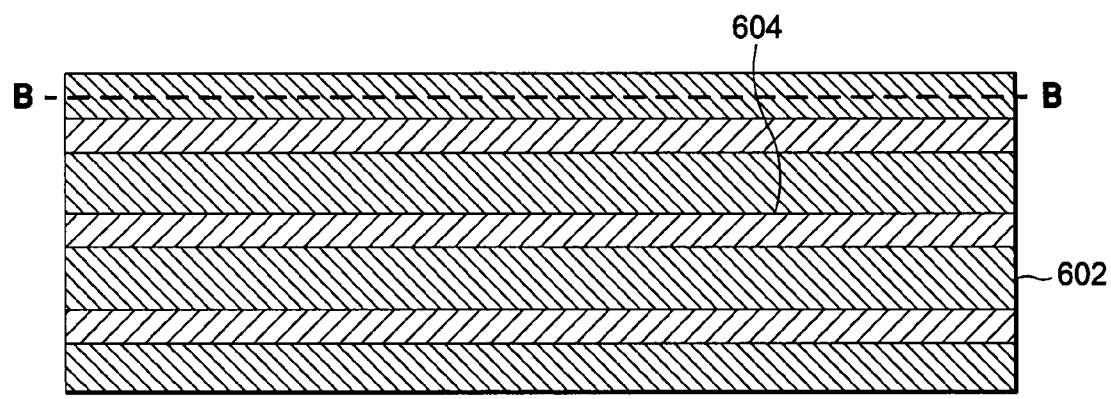
FIGS. 9a and 9b illustrate formation of an additional structured layer in accordance with an exemplary embodiment of the present invention.

Having described how structures may be formed of a transitional material in a sacrificial material, a process for combining structures to form a component of an element in accordance with an exemplary embodiment of the manufacturing process will now be described with reference to FIGS. 8, 9a, 9b, 10a, 10b and 11 where like numbered elements refer to the same features illustrated in the figures. In the figures, FIG. 9a is a top view of a component at one stage of the manufacturing process with FIG. 9b being a cross-sectional view taken along the dashed line BB. FIG. 8 is also a cross-sectional view of the component taken along BB but at a different stage of the manufacturing process. FIG. 10a is a top view of the component at another stage of the manufacturing process with FIG. 10b being a cross-sectional view corresponding to dashed line CC of FIG. 10a.

FIG. 8 illustrates depositing a new layer of substrate material 600 as an isolation layer on a surface of the sacrificial layer 302 that is supported by the substrate layer 300. The new layer of substrate material 600 covers the structure of transitional material 400 in the pattern formed in the layer of sacrificial material 302 having openings, such as opening 310, defining the pattern. In one embodiment of the manufacturing process, the new layer of substrate material 600 is doped n+Si thin film. The n+Si thin film may be amorphous, polycrystalline or crystalline. The material is n+Si to ensure that the new layer of substrate material 600 is a conductive layer which is electron dominant.

Figure 9B:
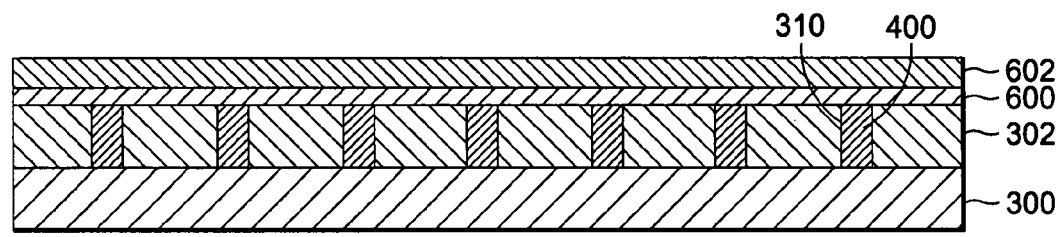
Figure 10A:
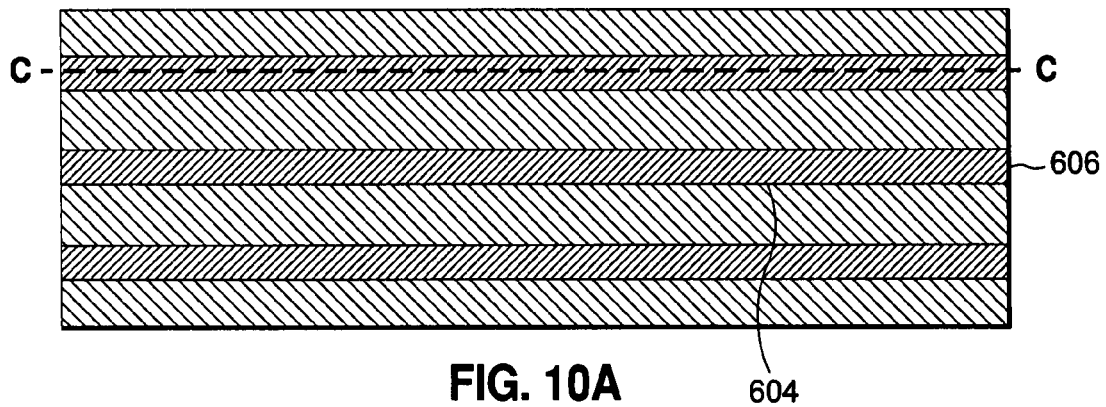
FIGS. 10a and 10b illustrate an additional structured layer in accordance with an exemplary embodiment of the present invention.

FIG. 9b illustrates forming a new layer of sacrificial material 602 on a surface of the new layer of substrate material 600. FIG. 9a illustrates the new layer of sacrificial material 602 being patterned in manner similar to the sacrificial layer 302. That is, one or more openings, such as opening 604 extending through the new layer of sacrificial material 602, form a pattern in the new layer of sacrificial material 602. In one embodiment of a manufacturing method in accordance with the present invention, the new layer of sacrificial material 602 is a continuous $SiO_2$ film approximately 60 nm thick which is deposited by CVD. The $SiO_2$ film is then patterned so as to form a grating structure which is substantially orthogonal to a grating structure defined in sacrificial layer 302. The pitch and the width of this grating structure is similar to the grating structure as defined in sacrificial layer 302. The pattern in the $SiO_2$ film is formed by etching which is stopped by the new layer of substrate material 600 which, in this manufacturing process, is Si.

Figure 10B:
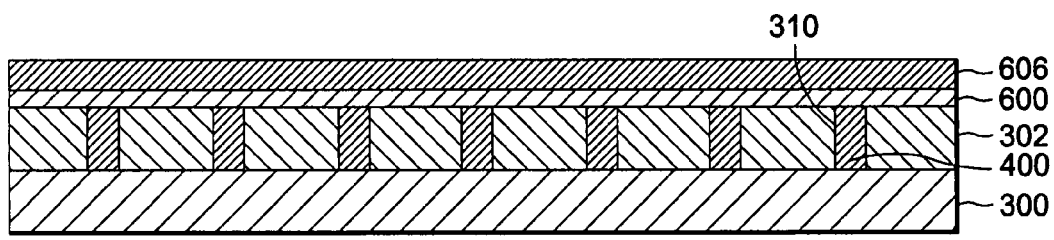

FIGS. 10a and 10b illustrate incorporating transitional material 606 in the openings of the pattern in the new layer of sacrificial material 602, thus forming a second structure of the transitional material on a surface of the new layer of substrate material 600. The transitional material may be formed in the pattern as previously described. This process of placing one structure layer on a surface of another structured layer may be repeated in order to build a component of an arbitrary number of structured layers.

Figure 11:
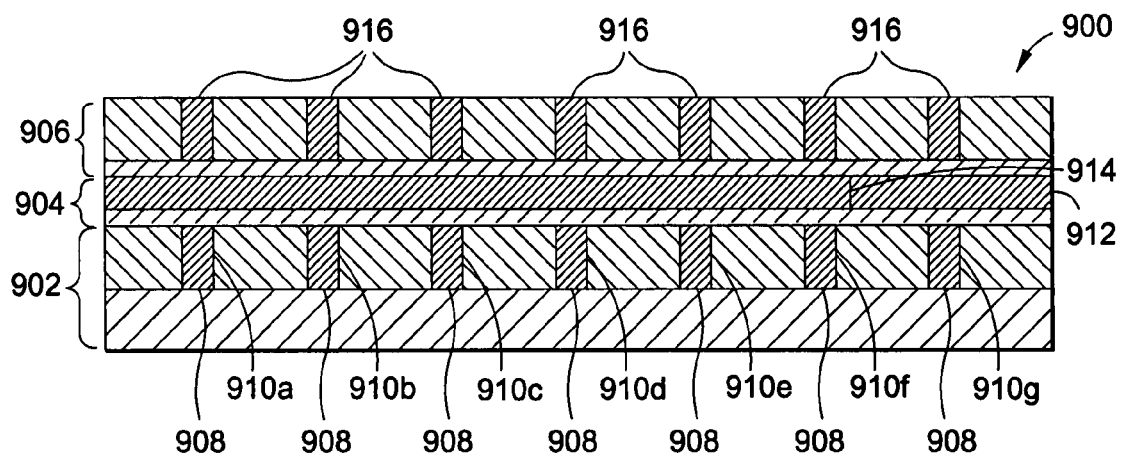
FIG. 11 is a component of an element in accordance with an exemplary embodiment of the present invention.

FIG. 11 illustrates a component 900 composed of three structured layers, 902, 904 and 906. As illustrated, each structured layer defines a structure of the transitional material embedded in a matrix of sacrificial material. In the illustrated embodiment, structured layer 902 defines a periodic grating structure 908 with elongated spaced apart periodic features or elements, 910a to 910g, with a longitudinal axis extending perpendicular to the plane of FIG. 11. Structured layer 904 defines a periodic grating structure 912 (of which only a cross section through a single elongated element 914 is shown) of transitional material and with a longitudinal axis essentially parallel to the plain of FIG. 11 and substantially orthogonal to the longitudinal axis of grating 908. In a similar manner, structured layer 906 defines a periodic grating structure 916 that has a longitudinal axis substantially parallel to the longitudinal axis of periodic grating structure 908.

Although the formation of component 900 has been described in relation to creating a set of stacked periodic grating structures, it should be understood that nothing in the foregoing description should be construed as a limitation on the types of structures that can be formed by manufacturing methods in accordance with various embodiments of the present invention. For example, that manufacturing method may be applied using any pattern or patterns formable in the sacrificial layer by any manufacturing technique. Furthermore, although the structured layers of component 900 have been described as being formed using the same techniques, individual structured layers may be formed using different techniques with out deviating from the spirit of the described manufacturing method.

Having described how a component of a transitional material may be formed through successive formation of structured layers, a method of forming an element from the component and annealing by a chemical process of the component in the element will now be described with reference to FIGS. 12a to 12g.

Figure 12A:
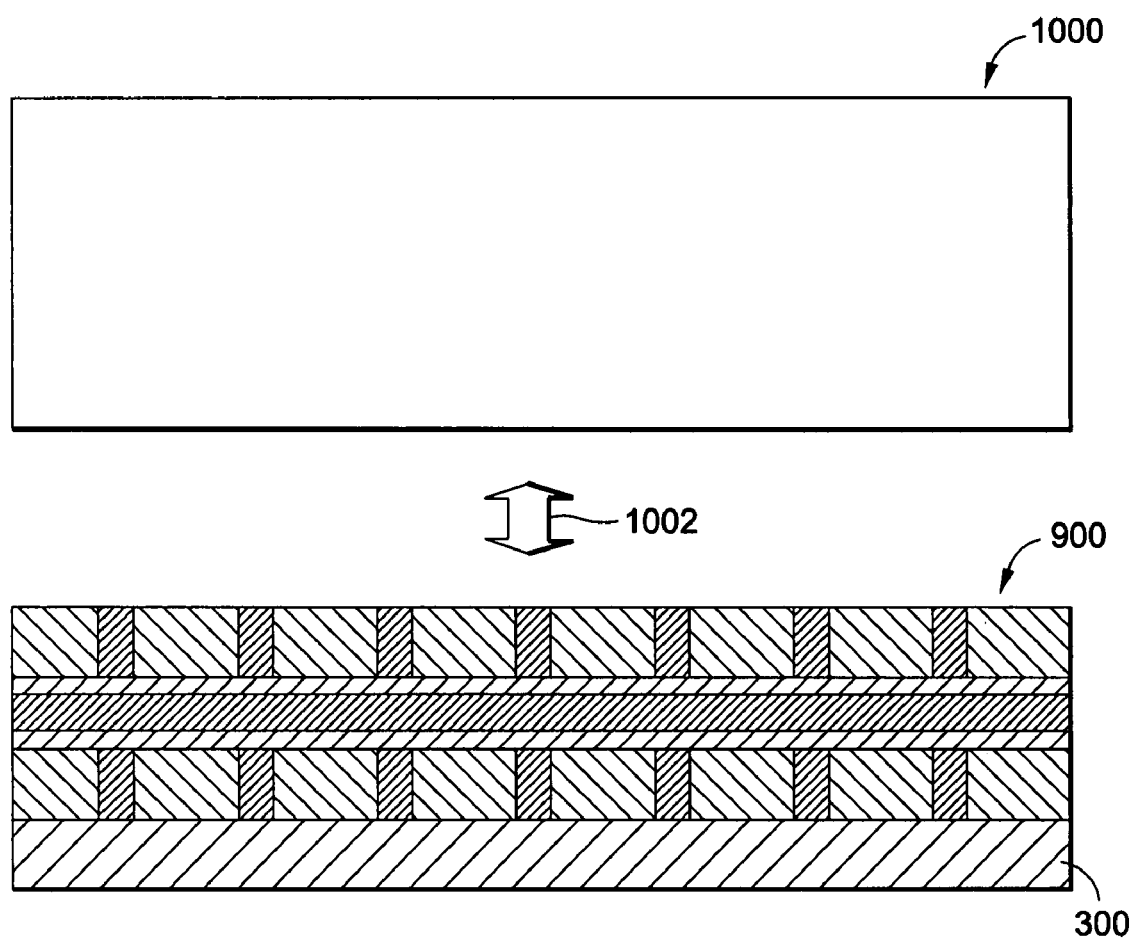
FIGS. 12a to 12g illustrate incorporating a component into an element and annealing the component in accordance with an exemplary embodiment of the present invention.
Figure 12B:
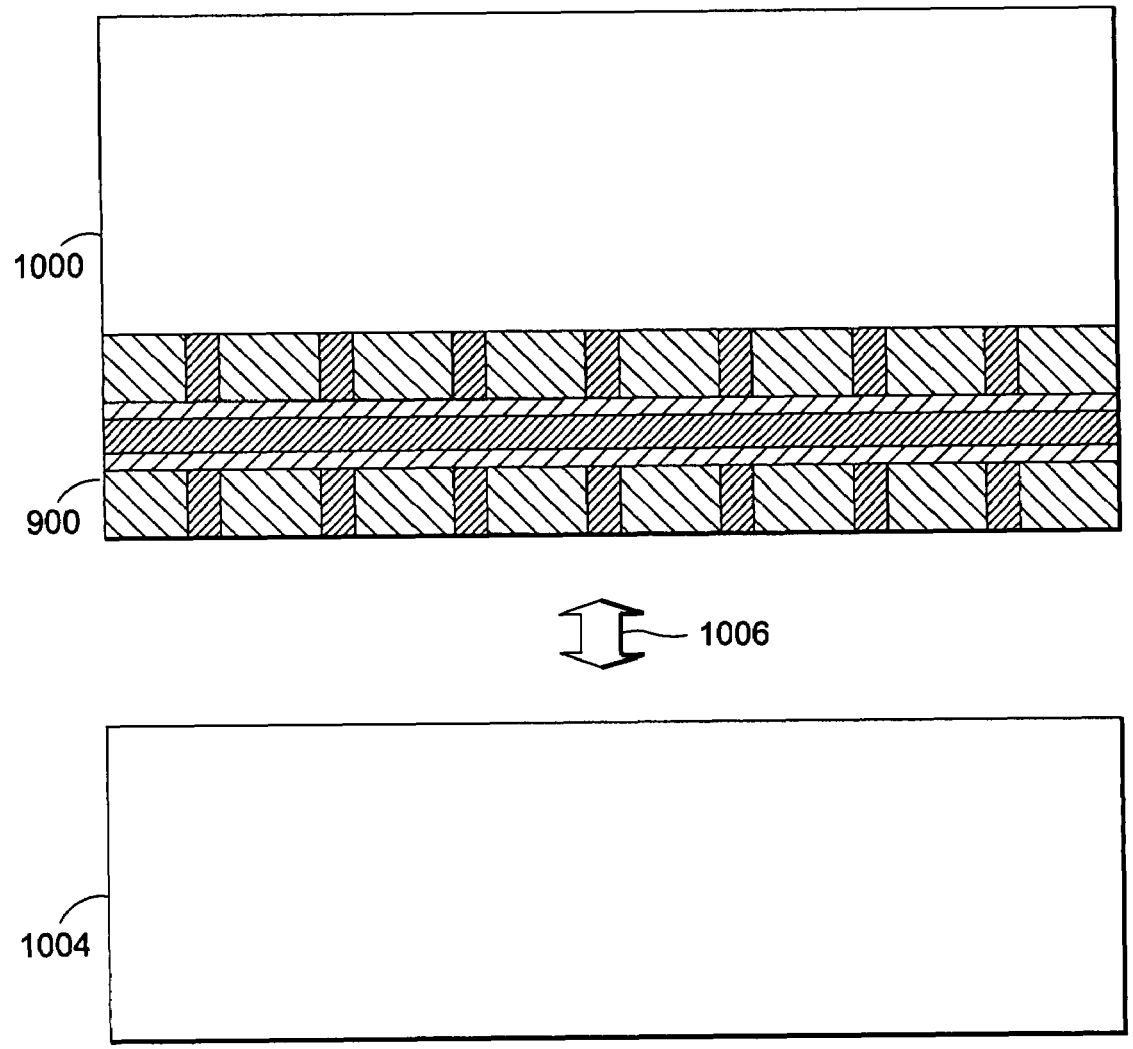

FIG. 12a illustrates attaching (1002) the component 900 to an additional component 1000 composed of another material. For example, component 1000 may be of a transparent material such as glass that is polished and attached to component 900 by bonding to form a portion of a final element such as a prism. Once component 900 is attached to component 1000, the substrate layer 300 may be removed by a process such as grinding or wet etching. FIG. 12b illustrates attaching (1006) another component 1004 to a surface of component 900 that was revealed by removal of the substrate layer 300.

Figure 12C:
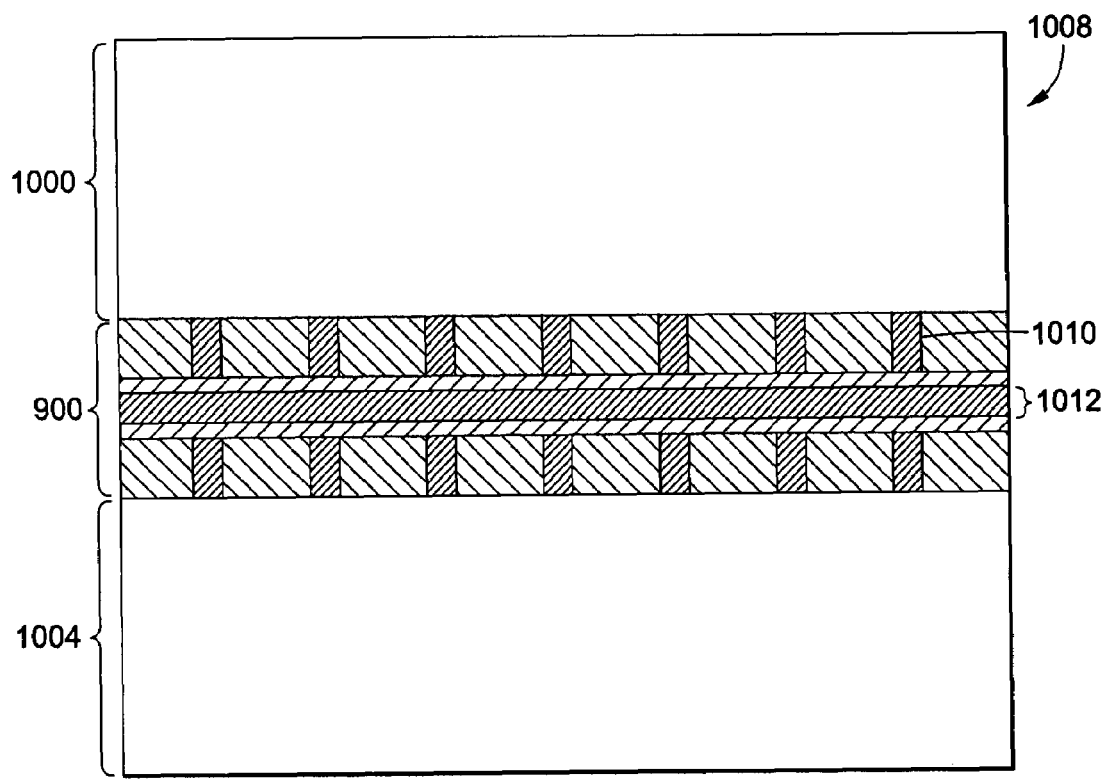

FIG. 12c illustrates an element 1008 formed from three components, 900, 1000 and 1004. As previously described, component 900 includes structured layers having sacrificial material interspersed with transitional material. As the sacrificial material and the transitional material have different properties, the sacrificial may be removed by a mechanical or chemical process that does not have as great an effect on the transitional material as the sacrificial material. When the sacrificial material is removed, this leaves behind a structure composed of transitional material 1010 which is attached to the layer of substrate material 1012.

Figure 12D:
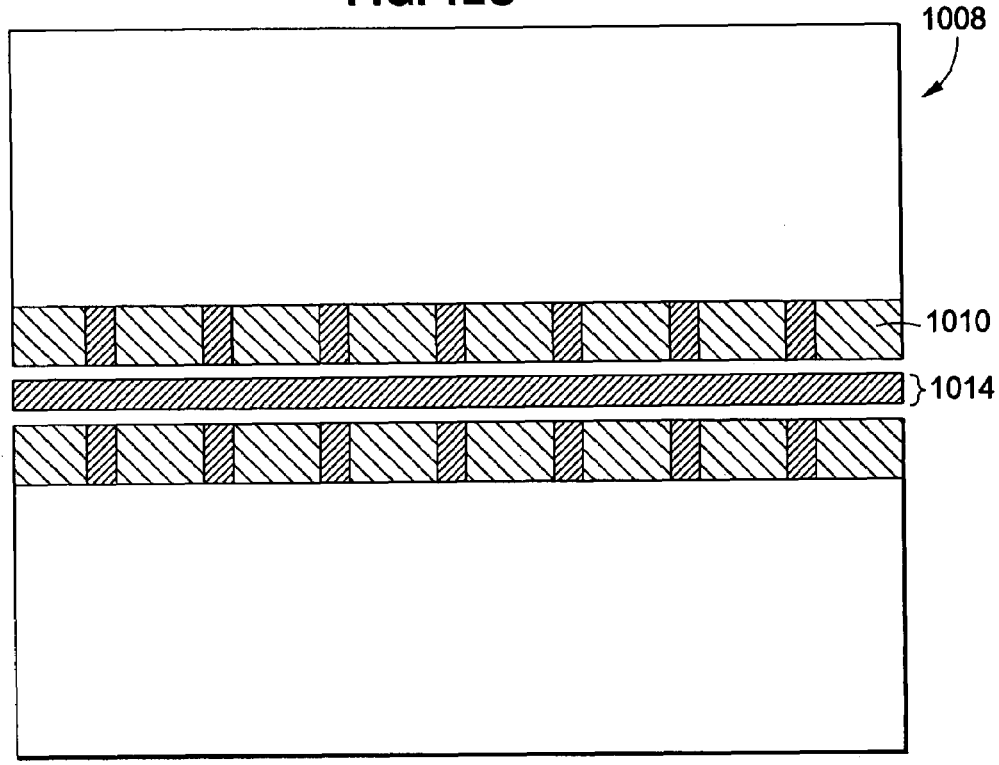

FIG. 12d illustrates removing the substrate material 1012 (of FIG. 12c) by annealing the substrate material so that it is changed into a material similar to the sacrificial material, and then removing the now changed substrate material, as indicated by voids 1014.

In one manufacturing method in accordance with an exemplary embodiment of the present invention, the substrate layers 1012 are composed of Si and are annealed by oxidation which may include a plasma assist technique. The resultant $SiO_2$ layer may then be removed by a wet or dry etching or process.

Figure 12E:
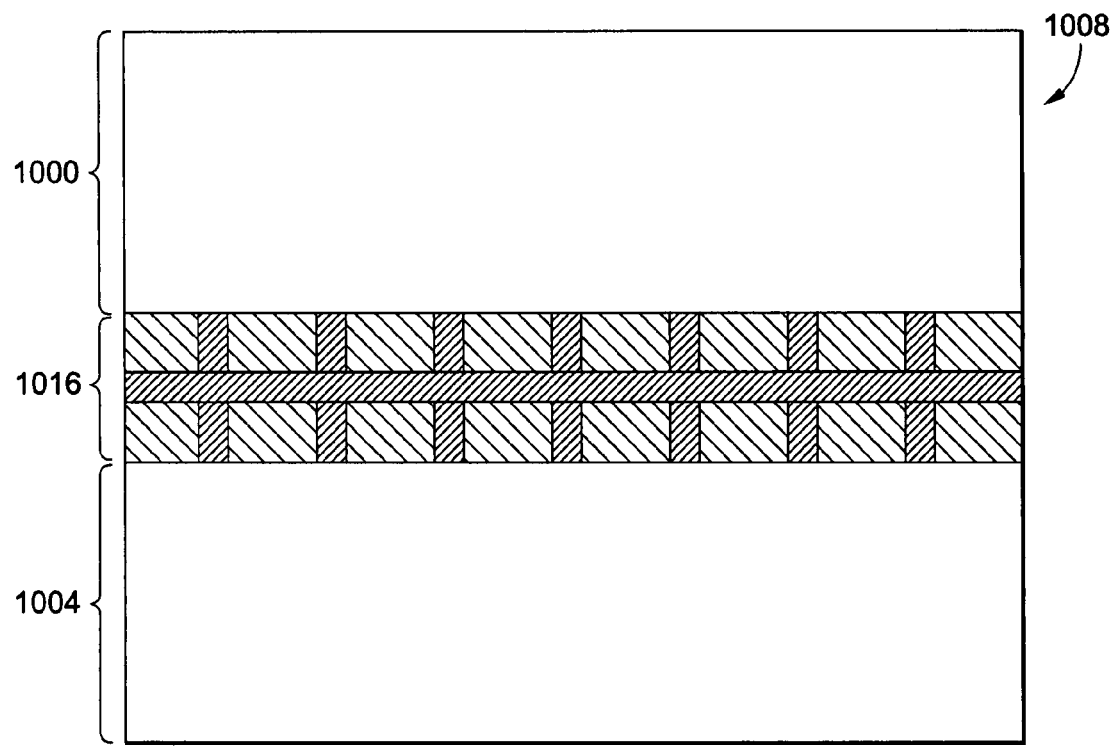
Figure 12F:
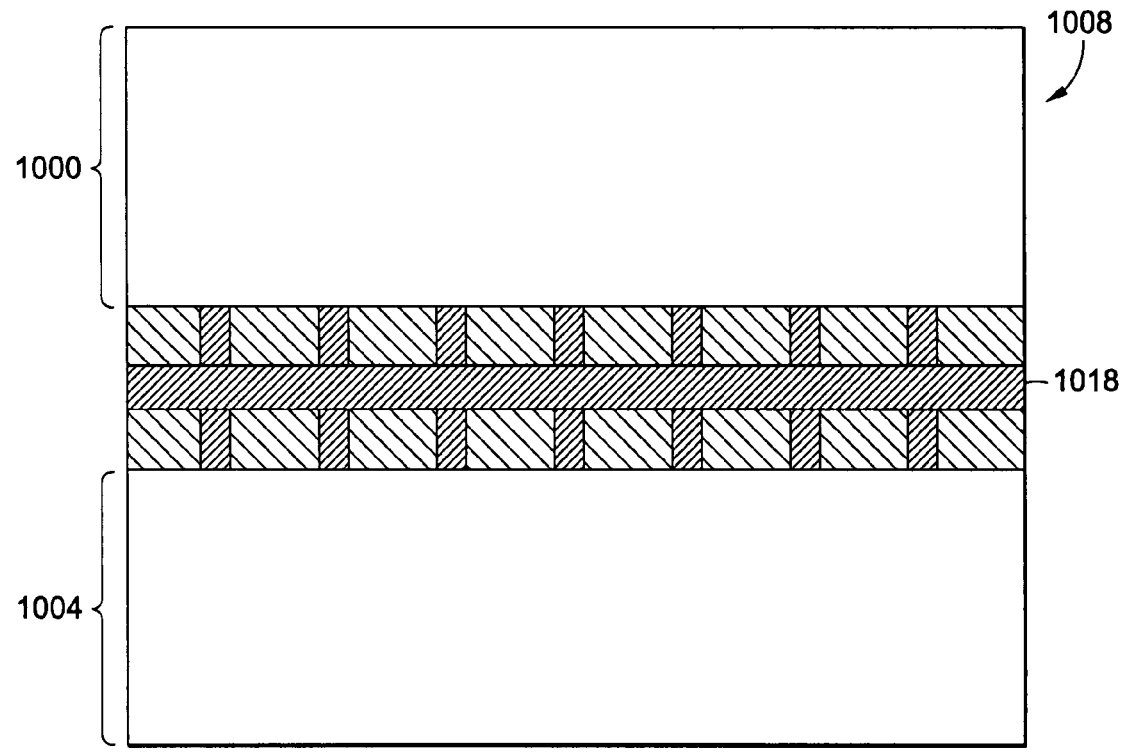
Figure 12G:
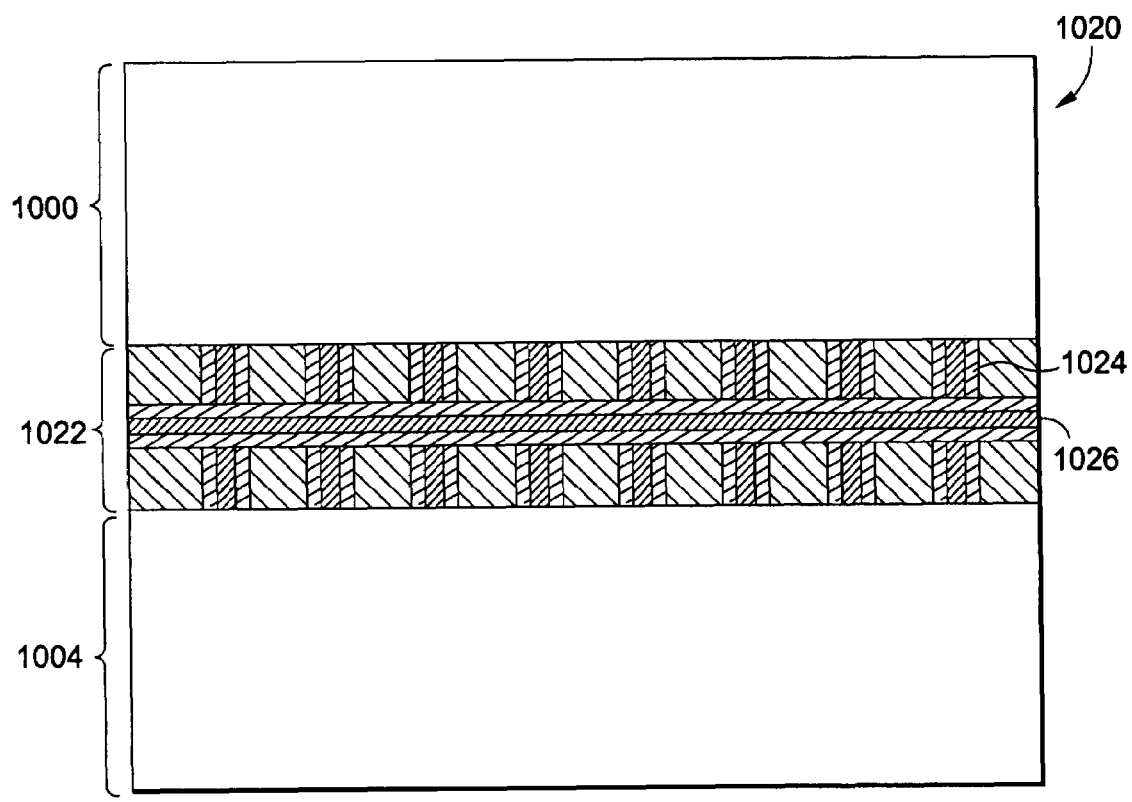

FIG. 12e illustrates element 1008 that is composed of three components. Component 1016 is composed substantially of transitional material that is between components 1000 and 1004. FIG. 12f represents annealing the transitional material into a final or desired material leaving the element 1008 having a structure 1018 that is composed of the final or desired material that is between components 1000 and 1004.

In one manufacturing method in accordance with an exemplary embodiment of the present invention, the transitional material is annealed by oxidation which may be include a plasma assist technique. In another manufacturing method in accordance with an exemplary embodiment of the present invention, the transitional material is annealed by nitridation which may include a plasma assist technique.

In one manufacturing method in accordance with an exemplary embodiment of the present invention, the transitional material is Al and the final or desired material is AlN. The Al is annealed by nitridation which may include a plasma assist technique.

In one manufacturing method in accordance with an exemplary embodiment of the present invention, plasma nitridation is performed with an $Ar/N_2$ mixed plasma at room temperature and then thermal nitridation in NH3 ambient pressure at 500 C is used for nitrogen incorporation in Al. These processes may be used alternately. In addition, in order to enhance the nitridation process, a thin native $Al_2O_3$ layer covering the Al before the plasma enhanced nitridation.

In one manufacturing method in accordance with an exemplary embodiment of the present invention, the element components are compressed in order to fill any voids left by removal of the additional layers of substrate material.

In one manufacturing method in accordance with an exemplary embodiment of the present invention, the annealing of the transitional material is not complete. That is, only a portion of the transitional material is annealed in order to create a component that will function properly in an element.

As illustrated in FIG. 12i, in one manufacturing method in accordance with an exemplary embodiment of the present invention, the transitional material may be a form of partially annealed final or desired material. That is, the transitional material may be partially nitrided already, but at a nitridation level lower than that of the final or desired material. In a like manner, the transitional material may be oxidized but at an oxidization level lower than that of the final or desired material. In accordance with this embodiment, component 1022 is composed substantially of transitional material that is between components 1000 and 1004. After the element 1020 is annealed, component 1022 has a portion 1024 composed of the final or desired material and a portion 1026 composed of the transitional material.

Even though the annealing process may result in partial annealing of component 1022, element 1020 will still be functional. For example, in the case of a PBS, because the wavelength of visible light is around 450 nm to 600 nm and a width of a grating structure is about 30 nm, even if a first material (such as Al) remains in the center portion of a grating as a core, the metal absorption of light will be still at an acceptable level. Furthermore, even if only a portion of a grating is changed, especially the surface area, from the first material into the final or desired material, transmittance of the PBS is improved (as there is less Al metal to absorb light) and scattering at the surface of the grating is reduced because the surface roughness can be reduced by annealing.

As another example, if the transition material is AlO or AlON, then the composition of portion 1024 of component 1022 may be expressed as $AlO_{x1}N_{y1}$ and the composition of portion 1026 of component 1022 may be expressed as $AlO_{x2}N_{y2}$, where $x1 \geq 0$, $y1 \geq 0$, $x2 \geq 0$, $y2 \geq 0$ with $(y2/x2) > (y1/x1)$. In general, as AlN has a higher refractive index than AlO, then nitridation will improve the optical performance of the component 1022.

Figure 13:
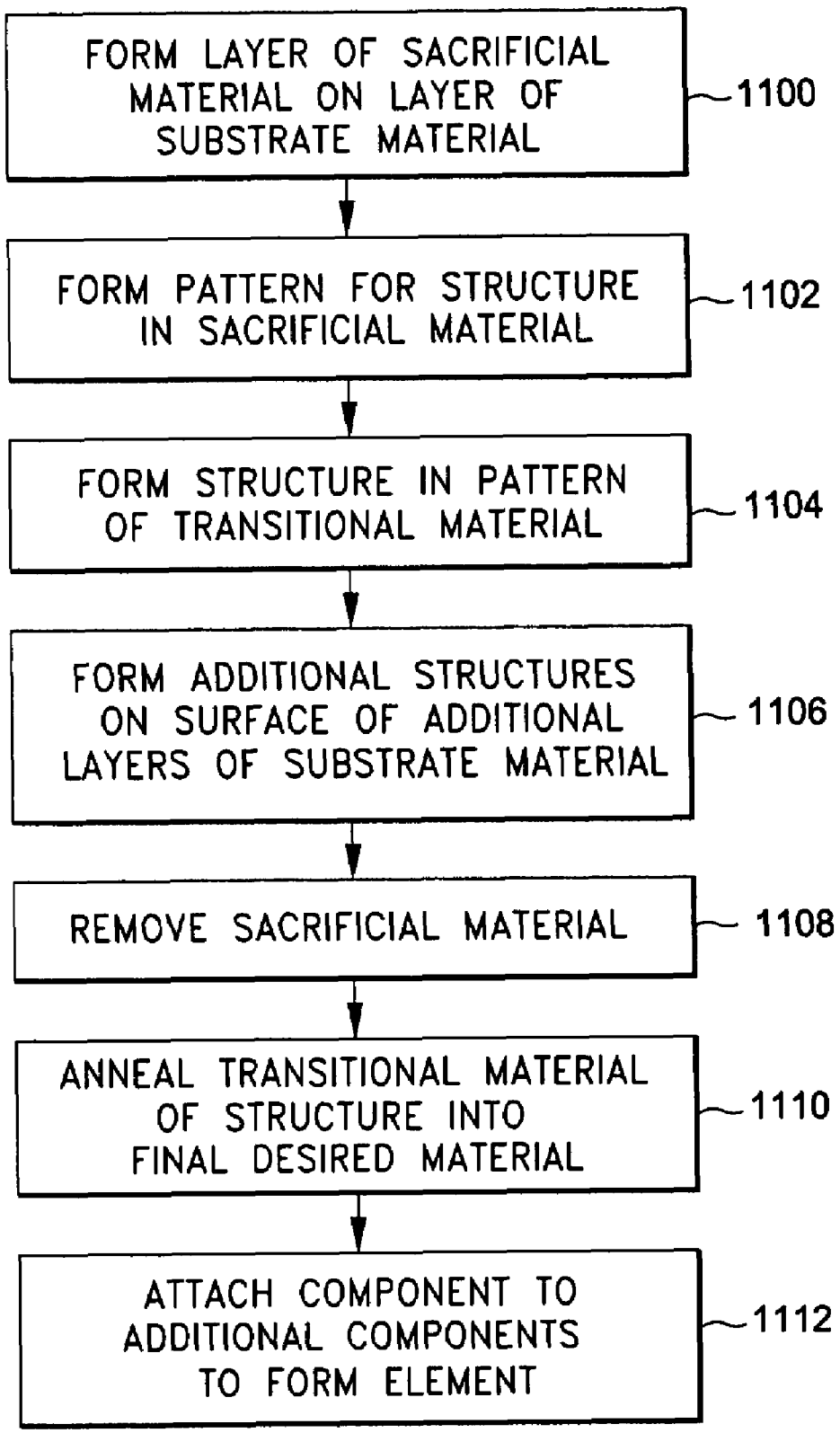
FIG. 13 is a process flow diagram of a manufacturing process in accordance with an exemplary embodiment of the present invention.

By altering some steps in the previously described manufacturing process, alternative transitional, desired and sacrificial materials may be employed. FIG. 13 is a process flow diagram of one such altered manufacturing process in accordance with an exemplary embodiment of the present invention. In this embodiment of the manufacturing method, a layer of sacrificial material is formed (1100) on a layer of substrate material. A pattern for a structure is then formed (1102) in the layer of sacrificial material. Once the pattern is formed, the structure is formed (1104) based on the pattern by selective growth of a transitional material. One or more additional structure may then be formed (1106) by forming an additional layer on new layers of substrate material which are formed on a preceding structure. Additional structures may be added for as many times as needed to form a component for an element. Once the component is complete, the sacrificial material is removed (1108) and the transitional material is annealed (1110) to form the final or desired material of the component. The original layer of substrate material is removed and additional components are attached (1112) to form a final element.

Figure 14A:
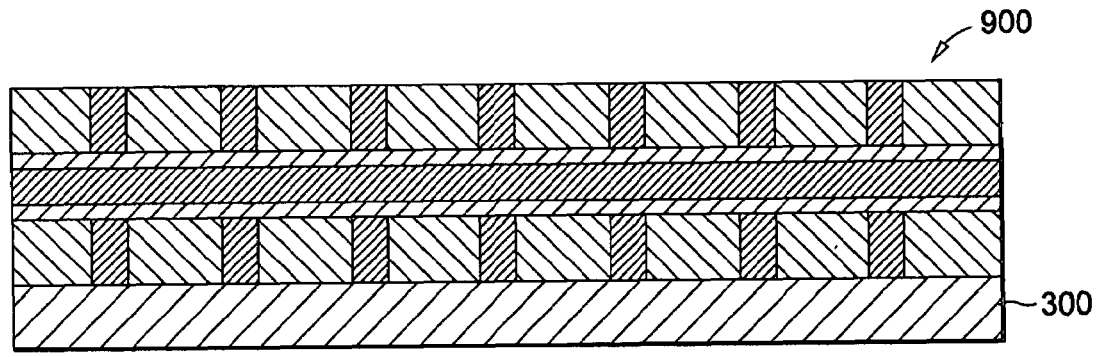
FIGS. 14a to 14d illustrate sacrificial material removal and annealing of a component in accordance with an exemplary embodiment of the present invention.
Figure 14B:
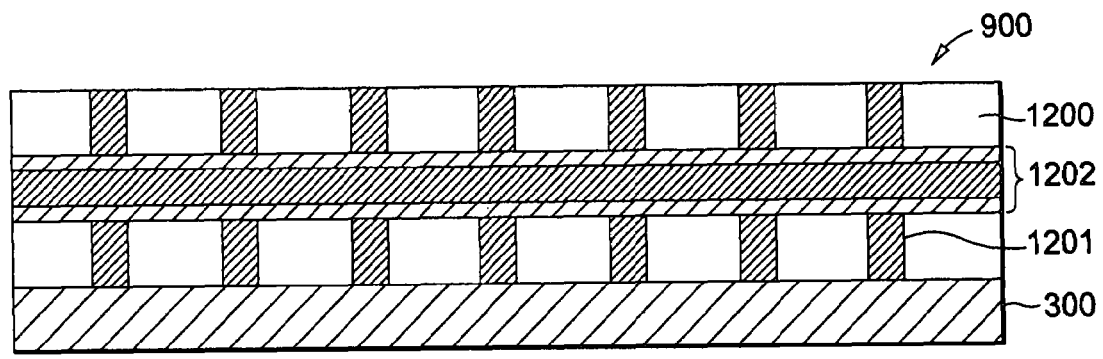
Figure 14C:
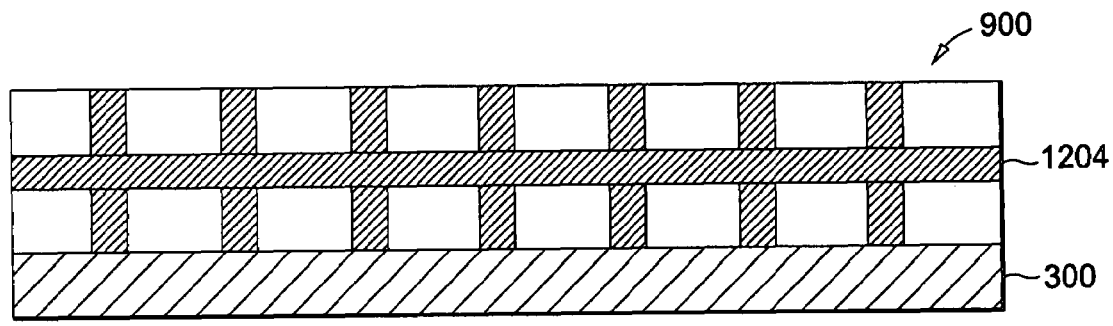
Figure 14D:
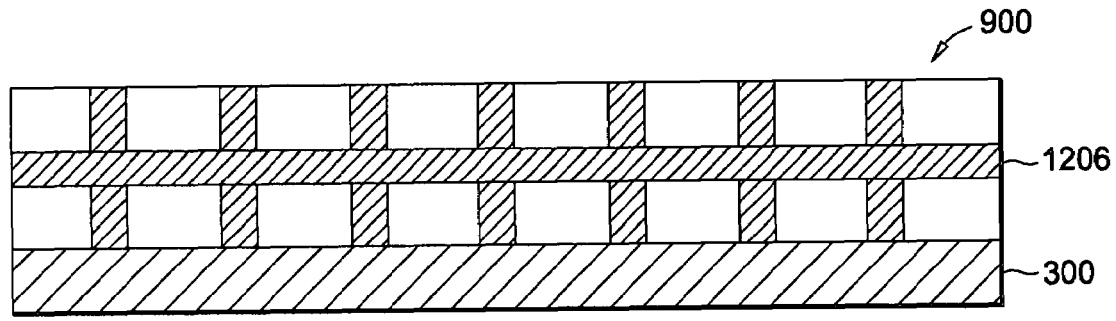

In slightly more detail than in FIG. 13, FIGS. 14a to 4d illustrate changing the transitional material in the component 900 into the final or desired material before component 900 is incorporated into an element. To do this, the component 900 is left attached to the substrate layer 300 after completing the structured layer as illustrated in FIG. 14a. The sacrificial material in the structured layers is removed, such as by selective etching, leaving voids, such as void 1200, in the structured layers as illustrated by FIG. 14b. This exposes the structures composed of the transitional material, such as structure 1201, and the additional layers of substrate material 1202. The additional layers of substrate material are changed into the sacrificial material by annealing and then removed as illustrated by FIG. 14c. This leaves behind a component structure 1204 which is composed primarily of transitional material. The transitional material is annealed which changes the component into a structure 1206 composed primarily of the desired material as illustrated in FIG. 14d. The component may then removed from the layer of substrate material 300 and incorporated into an element as previously described.

By not incorporating the component 900 into an element before annealing, additional processing techniques can be used to accelerate the annealing process. For example, one can accelerate nitridation of the component 900 on a Si base substrate through elevated temperatures. In addition, the component structures are more exposed to any plasma used in the annealing process.

Figure 15A:
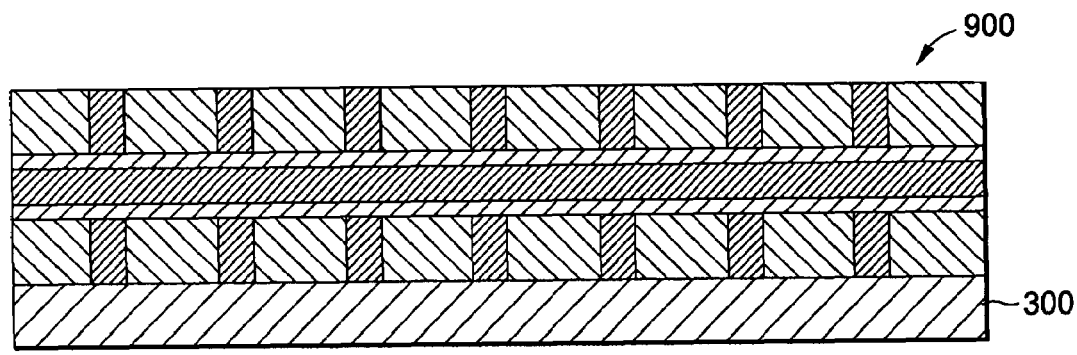
FIGS. 15a to 15c illustrate sacrificial material removal and annealing of a component in accordance with an exemplary embodiment of the present invention.
Figure 15B:
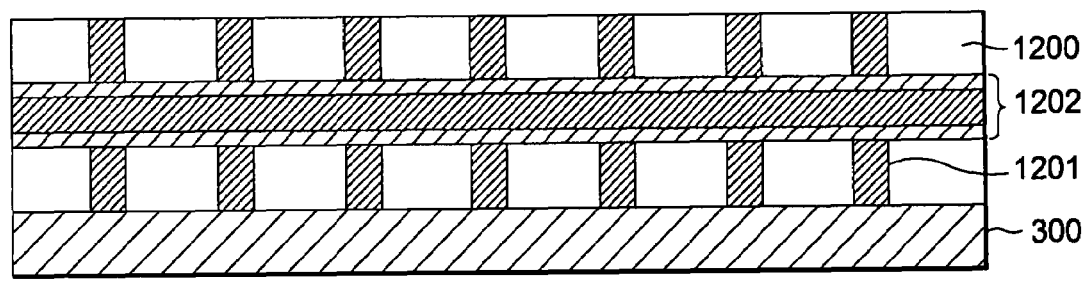
Figure 15C:
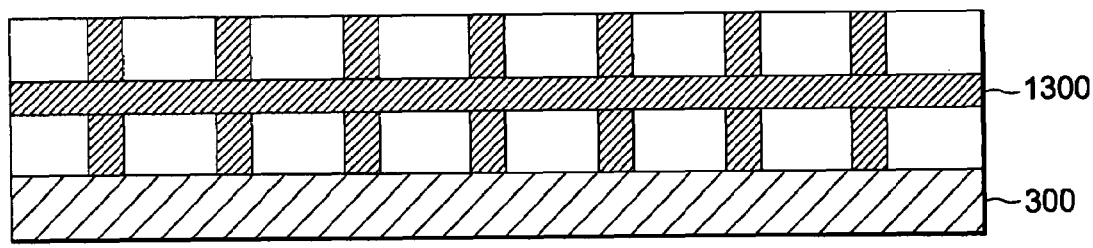

FIGS. 15a to 15c illustrate additional processing techniques made possible by delayed incorporation of the element 900 into an element. In this process technique, the component 900 is left attached to the substrate layer 300 after completing the structured layer as illustrated in FIG. 15a. The sacrificial material in the structured layers is removed, such as by selective etching, leaving voids, such as void 1200, in the structured layers as illustrated by FIG. 15b. This exposes the structures composed of the transitional material, such as structure 1201, and the additional layers of substrate material 1202. In this technique, the transitional material is annealed without removing the additional layers of substrate material 1202. The component may then removed from the layer of substrate material 300 and incorporated into an element as previously described.

In one manufacturing process in accordance with an exemplary embodiment of the present invention, the transitional material is Al, the final or desired material is $Al_2O_3$ and the substrate material is Si. The Al may be annealed using a plasma assist oxidation process with an Ar/O2 mix.

In another manufacturing process in accordance with an exemplary embodiment of the present invention, the transitional material is Si which is deposited into a pattern in a sacrificial layer using CVD. In this case, if the Si is deposited on the sacrificial layer such as by $SiCl_4$ selective growth, the Si may be polished off after the CVD process. In this manufacturing process the Si in both the component structures and the additional layers of substrate material is changed into $Si_3N_4$ by plasma assist and thermal nitridation process. During thermal nitridation, one can increase the temperature as high as 1000 C because there is no restriction to raise the temperature because of the materials used.

Figure 16A:
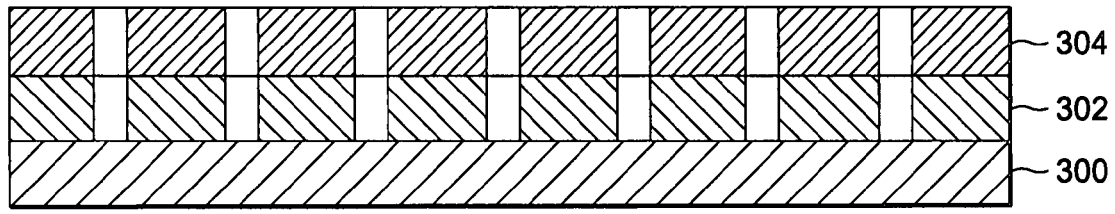
FIGS. 16a to 16e illustrate filling a pattern in accordance with an exemplary embodiment of the present invention.
Figure 16B:
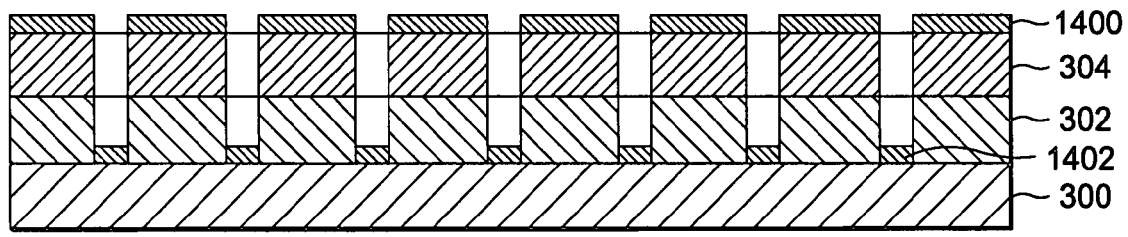
Figure 16C:
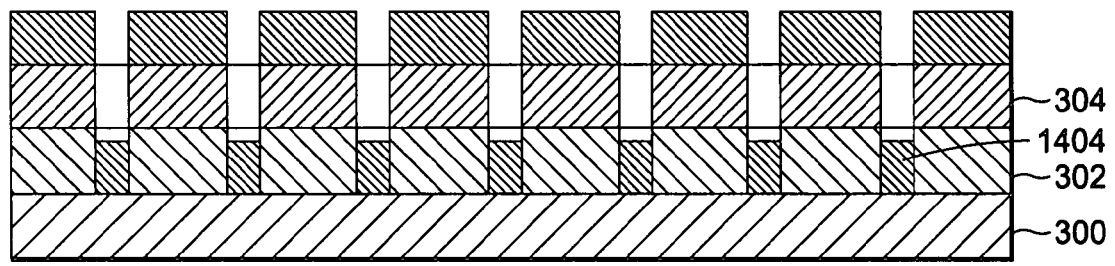
Figure 16D:
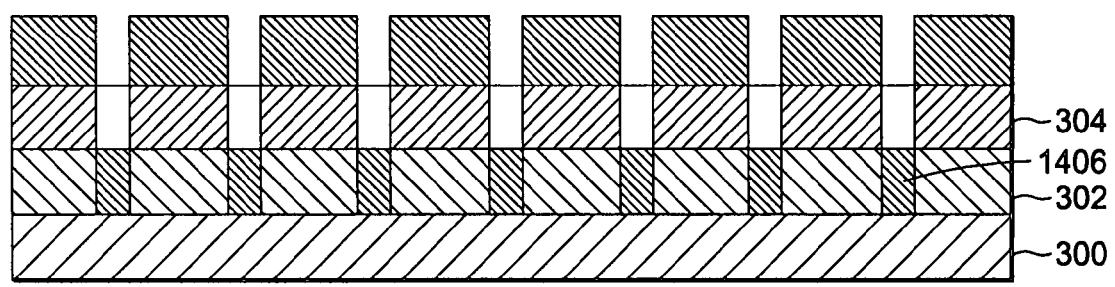
Figure 16E:
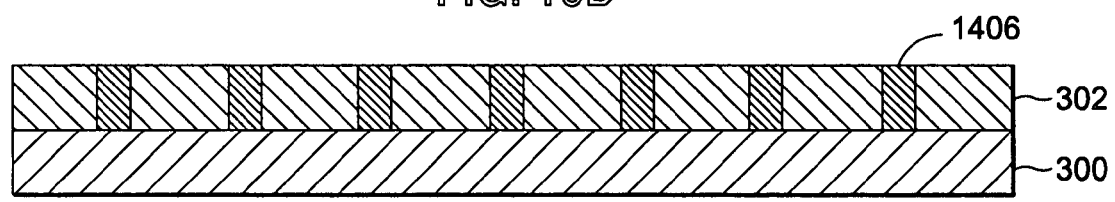
Figure 17A:
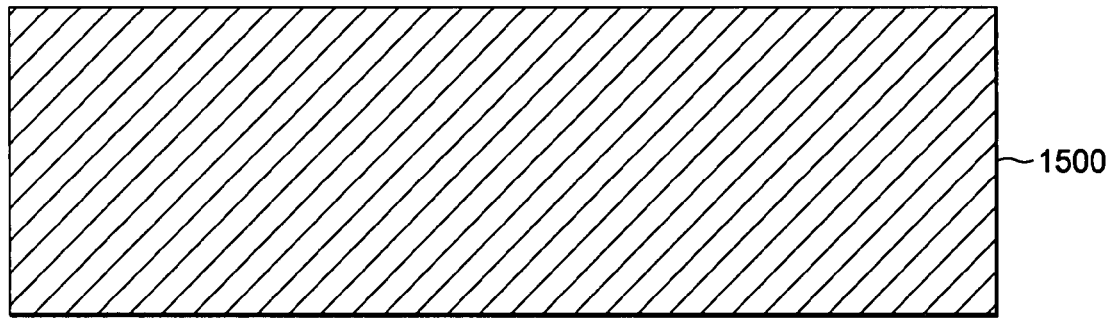
FIGS. 17a to 17d illustrate forming a pattern in a layer of substrate material in accordance with an exemplary embodiment of the present invention.
Figure 17B:
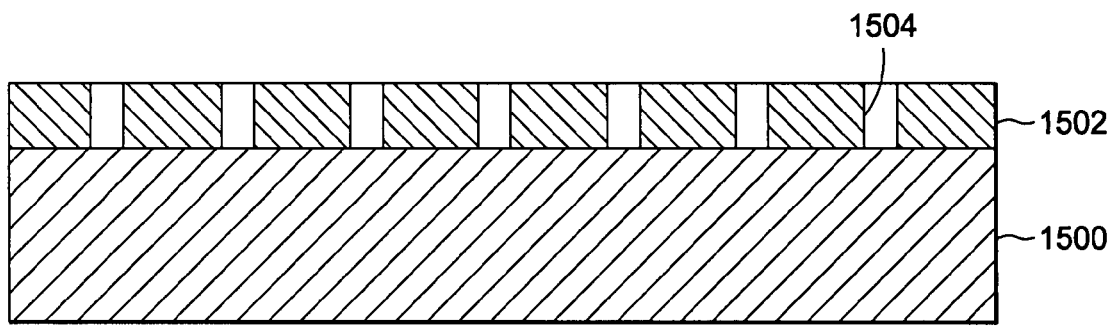
Figure 17C:
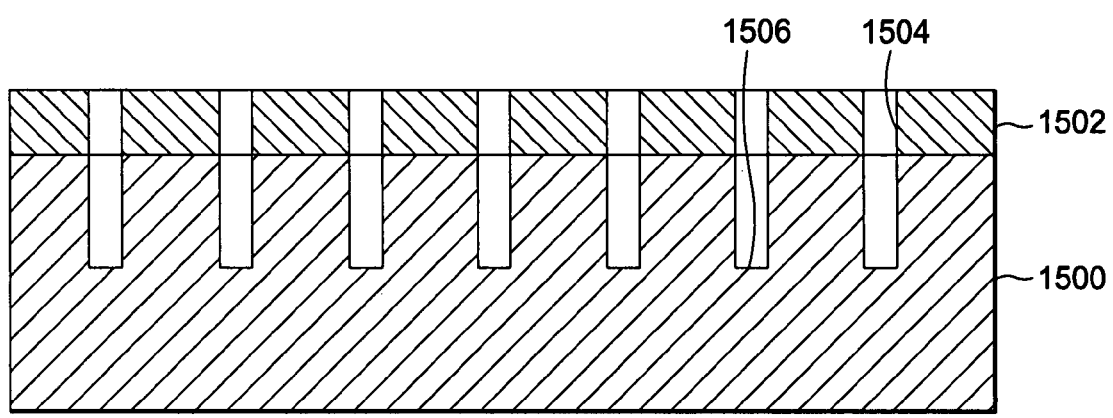
Figure 17D:
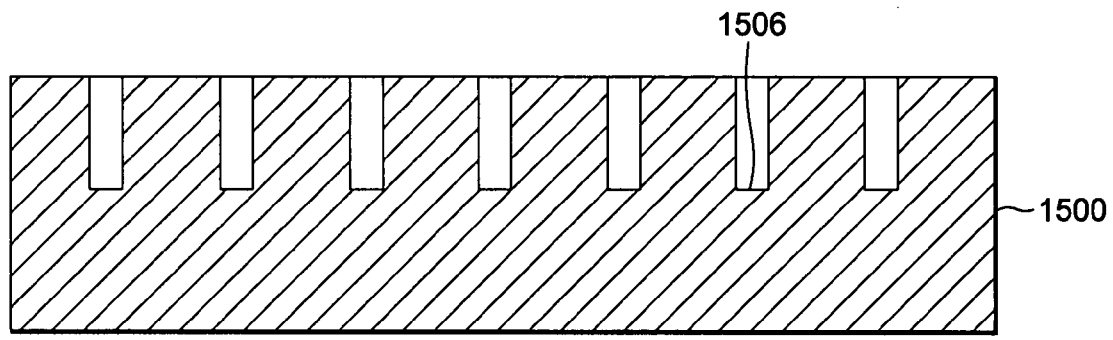

In one manufacturing process in accordance with the present invention, the transitional material is $ZrO_2$ and the final material is ZrON. In this manufacturing process, a structure for a component of a transitional material is formed by ALD and liftoff of a resist layer. The ALD and liftoff process is illustrated in FIGS. 16a to 16e. In the process, a layer of sacrificial material 302 is formed on a layer of substrate material 300 and covered with a resist layer 304. A pattern is formed in the layer of sacrificial material as previously described and illustrated in FIG. 16a. To fill the pattern, a $ZrCl_4$ monolayer is deposited by an ALD process and $H_2O$ gas is introduced to form a layer of $ZrO_2$ as shown in FIG. 16b. This process is repeated to build up the $ZrO_2$ 1404 until the $ZrO_2$ 1406 fills the pattern. The resist layer 304 is then removed, leaving the built up $ZrO_2$ in the pattern.

Additional structures may then be added and the resultant component may be annealed and incorporated into an element as previously described. By nitridation process, the refractive index of a grating structure increases from that of the transitional material $ZrO_2$.

In one manufacturing process in accordance with the present invention, the transitional material is HfONx and the final or desired material is HfONy wherein x<y.

In one manufacturing process in accordance an exemplary embodiment of the present invention, the transitional material is used to create a structure for a component using ALD but without the use of a pattern. In this process, etching may be used to refine the structures. The sacrificial material is then added to the voids in the structure and polished by Chemical Mechanical Polishing (CMP).

In one manufacturing process in accordance with an exemplary embodiment of the present invention, a photon-assisted electrochemical etch process is used to create a pattern for formation of structures for a component. Electrochemical etch may also be referred as photon-assisted electrochemical etch, if photon absorption is critical. Electrochemical etching is a variant of simple wet etch (i.e. chemical etch), by the application of external electrical bias field. Like other wet etching processes, electrochemical etching is significantly lower in cost than dry etching (i.e. plasma etch) processes. In HF electrolyte based photon-assisted electrochemical etch of N-type Si a tip of and etched pit attracts more holes in the Si, and form a positive feedback process of anisotropically etching high aspect ratio trenches.

As illustrated in FIGS. 17a to 17d in the manufacturing process using photon-assisted electrochemical etching, a layer 1500 of N-type single crystal Si serves as both a layer of substrate material and as a layer of sacrificial material. A layer of resist material 1502 is formed on a surface of layer 1500. A pattern of openings 1504 extending through the layer of resist material 1502 to layer 1500 is formed as previously described. Photon-assisted electrochemical etching, for example using an HF electrolyte, is used to form high aspect ratio trenches 1506 in layer 1500. The layer of resist material 1502 is then removed leaving behind a pattern in layer 1500 composed of the trenches 1506. The pattern in layer 1500 may be filled with a transitional material to form a structure for a component as previously described.

As illustrated in FIGS. 18a to 18e, additional stacked structures for a component are formed on new layers of N-type Si which are formed by a process of laser annealing a layer of amorphous or poly-crystalline silicon. In the process, a layer of amorphous or poly-crystalline silicon 1604 is formed in a low vacuum process, such as Plasma Enhanced Chemical Vapor Deposition (PECVD), on a surface of layer 1500 that has a pattern filled with a transitional material 1600.

Figure 18A:
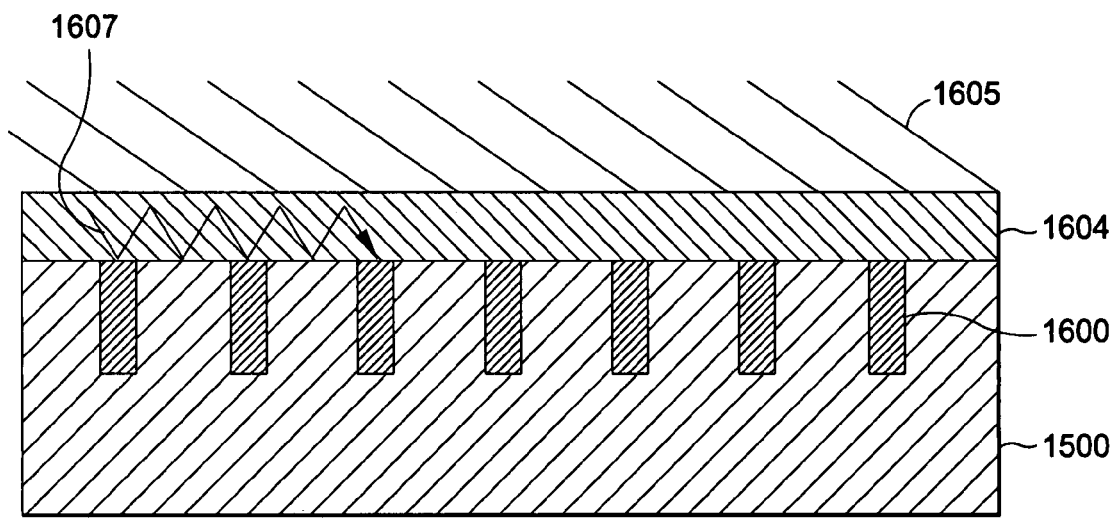
FIGS. 18a to 18f illustrate formation of a component for an element in accordance with an exemplary embodiment of the present invention.
Figure 18B:
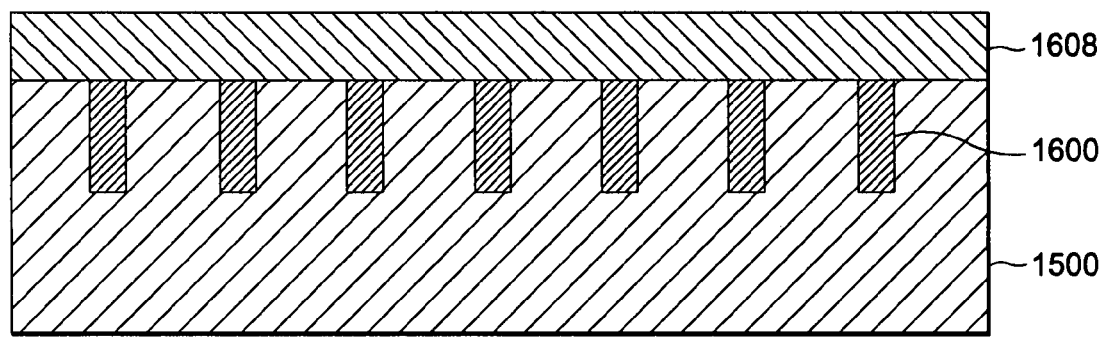

Layer 1604 is irradiated using a large area, high power, annealing laser pulse 1605 at a glancing angle to a surface of layer 1604. The tilted incident beam can be projected to a larger surface area of layer 1604 than a given a fixed beam diameter laser. In addition, the tilted incident beam can be absorbed more rapidly near the surface of layer 1604, without much heating to the deeper regions of layer 1500 or of structure 1600. Finally, the high average refractive index of amorphous silicon in layer 1604 forms a natural optical waveguide 1607 that traps the annealing laser beam 1605 in the surface of layer 1604. This further enhances the surface annealing energy, and reduces the risk of melting the underlying structure 1600. Moreover, such an annealing process can be incorporated in the same time as the PECVD process is still being performed. Once annealed, layer 1604 is changed into a layer 1608 of single crystal Si, or polycrystalline Si with an average crystal sized larger than several micrometers as illustrated in FIG. 18b.

Figure 18C:
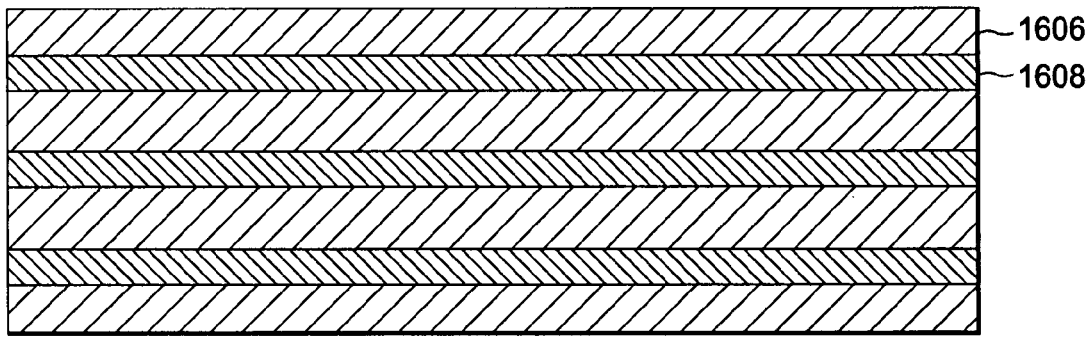
Figure 18D:
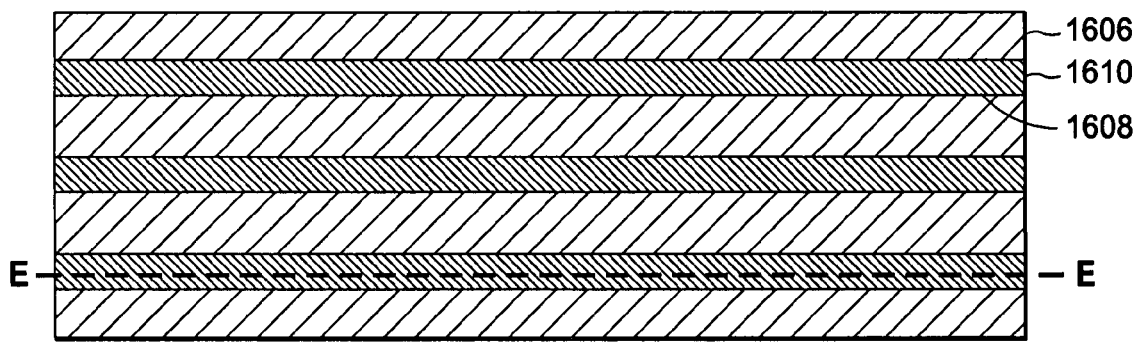
Figure 18E:
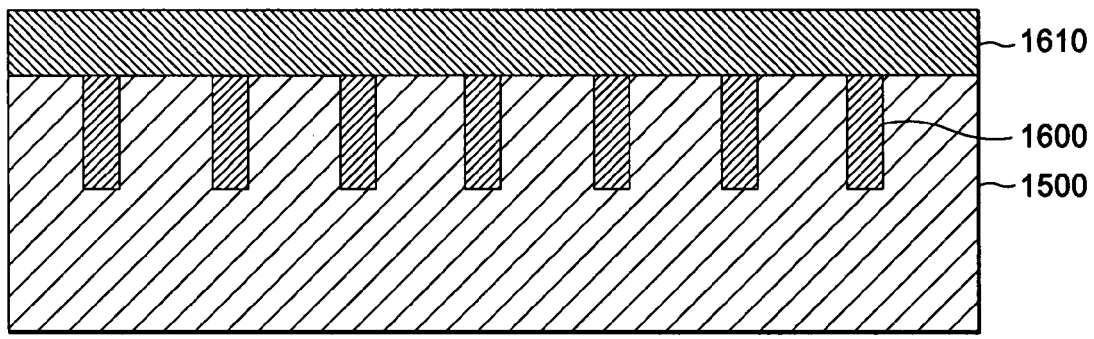

FIG. 18c is a top view of forming a pattern 1608 in layer 1606 by additional photon-assisted etching. Once pattern 1608 is formed, additional transitional material 1610 can be formed in the pattern to form an additional structure for a component as illustrated in the top view of FIG. 18d. FIG. 18e is a cross-sectional view taken along the dashed line EE of FIG. 18d and illustrates structure 1610 and 1600 forming part of a component structure and supported in layer 1500.

Figure 18F:
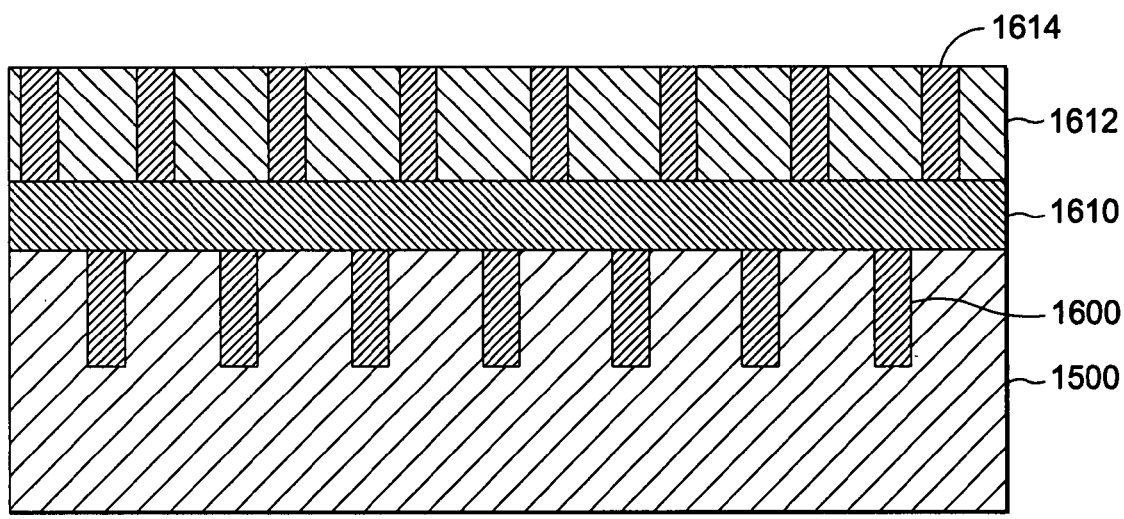

FIG. 18f illustrates an additional structure 1614 being added for the component in an additional layer of sacrificial material 1612. Once the component structure is completed, it can be can be freed from its surrounding sacrificial material by wet etching in KOH.

In one manufacturing process in accordance with an exemplary embodiment of the present invention, the transitional material is $TiO_2$ which is annealed by nitridation.

In one manufacturing process in accordance with an exemplary embodiment of the present invention, a weaker acid (e.g. HCl), instead of HF, is used to complete the photon-assisted electrochemical etch for additional structures.

In another manufacturing process in accordance with an exemplary embodiment of the present invention, crystalline $TiO_2$ is formed by heating or post-annealing in order to increase the transitional material's resistance to HF acid.

Figure 19A:
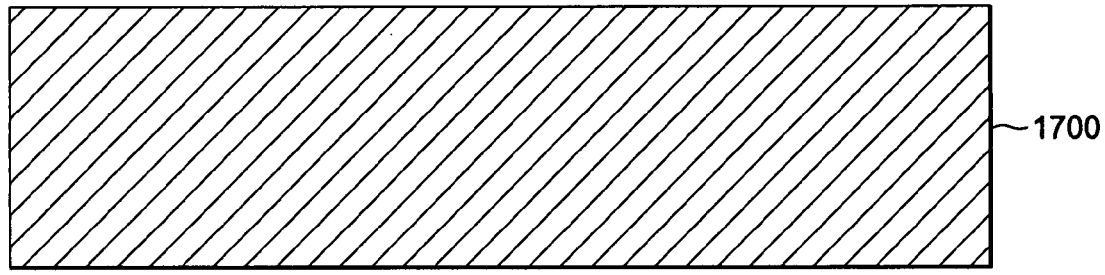
FIGS. 19a to 19c illustrate formation of a structured layer for a component in accordance with an exemplary embodiment of the present invention.
Figure 19B:
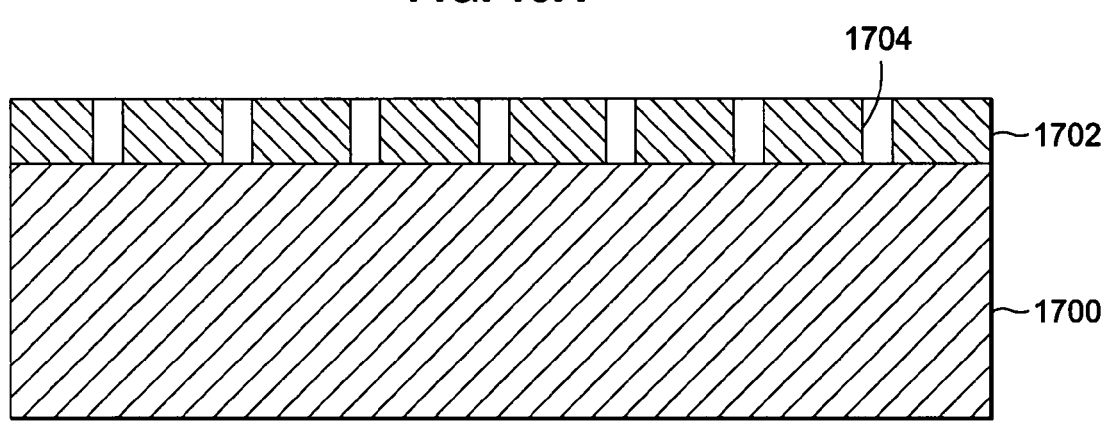
Figure 19C:
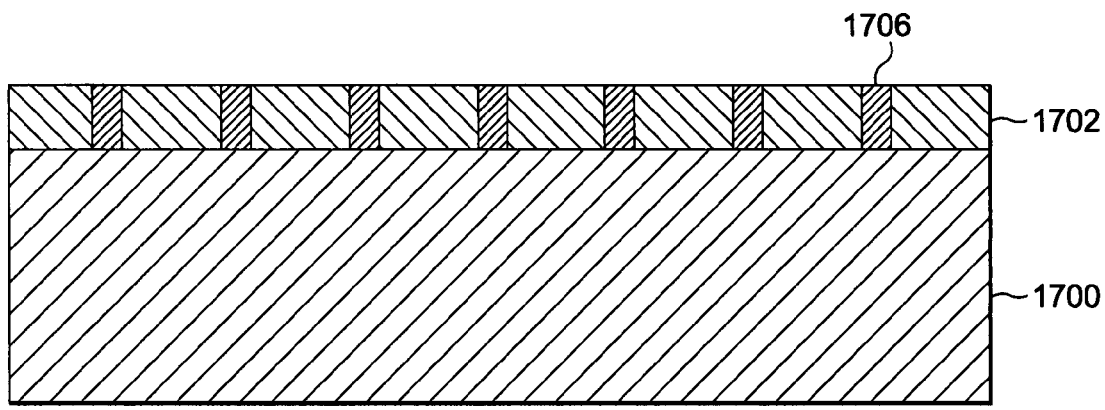

In another manufacturing process in accordance with an exemplary embodiment of the present invention, a non-porous anodic barrier process is used to grow a transitional material on a layer of substrate material (for example Al). FIGS. 19a to 19c illustrate this process. FIG. 19a illustrates an initial layer 1700 of substrate material a surface of which is cleaned and polished. FIG. 19b illustrates formation of a layer of a sacrificial material 1702 on the cleaned surface. A pattern of openings 1704 is formed in layer 1702 as previously described.

To form a non-porous barrier oxide on the substrate material, a nearly neutral solution as electrolytes is chosen. For Al, there are a variety of choices, including ammonium borate, phosphate, or tartrate compositions. To form the non-porous barrier oxide, layer 1700 is attached to the anode of an electrical source and submerged in an electrolyte. The cathode is a conductive plate of carbon, lead, nickel, stainless steel, or others submerged in the electrolyte. If the substrate material is Al, then $Al_2O_3$ is formed as the transitional material 1706 which is deposited in the pattern 1704 in layer 1702.

The ion transportation process is a very well defined process, with few variations. The field intensity inside an oxide layer needed for the ion to transport is almost a constant in practice. For Al, such a bias is (0.9~1.2 nm/Volt). The exact value of this figure is determined by the purity of the substrate material in layer 1700. Therefore, purity, initial oxide quality, temperature, and other physically controlled conditions may be held constant resulting in a constant rate for a given set of processing conditions. Therefore, in practice, a targeted oxide layer growth thickness can achieved to a high precision by simply controlling the bias voltage.

The upper limit of the non-porous barrier oxide thickness achievable is limited by breakdown voltage of the electrolyte itself. Above such bias, sparking occurs. Experimentally, the highest operation voltage for a substrate material of Al that has been demonstrated is 1000 Volts. At a rate of 1.1 nm/volt, it corresponds to a maximum thickness of 1100-nm. Again, since this voltage limit is dictated by the breakdown of the electrolyte, such a limit is not intrinsic, and can potentially be raised by selecting a more resilient electrolyte composition. Also, in the case of Al, the oxide layer grown can be either amorphous or crystalline, which can be controlled by physical conditions, such as bath temperature.

In another manufacturing process in accordance with an embodiment of the present invention, the substrate material for layer 1700 is Ti and the transitional material is a Ti-oxide.

In another manufacturing process in accordance with an embodiment of the present invention, multiple layers of structures for a component are formed by a non-porous anodic barrier process and are combined in the later steps of the fabrication by direct wafer bonding to form a component structure for use in an element as previously described.

In another manufacturing process in accordance with an embodiment of the present invention, as illustrated in FIGS. 20a to 20e, a porous anodizing process is used to generate a patterned layer of sacrificial material. Compared to the non-porous barrier oxide forming process discussed above, the only difference in conditions in practice is selecting an acid electrolyte, instead of neutral solutions. Typical acid solutions of choice are diluted sulfuric acid (1% molar concentration), phosphoric acid, oxalic acid, or more exotic mixes (e.g. $H_2O+CrO_3+H_3PO_4+H_2SO_4$).

For an Al substrate material, the electrolyte should naturally etch $Al_2O_3$. This is because the during the porous barrier process, the sacrificial material will need to be etched at the electrolyte/material interface. In addition, the etch speed can be enhanced by a local electrical field.

Figure 20A:
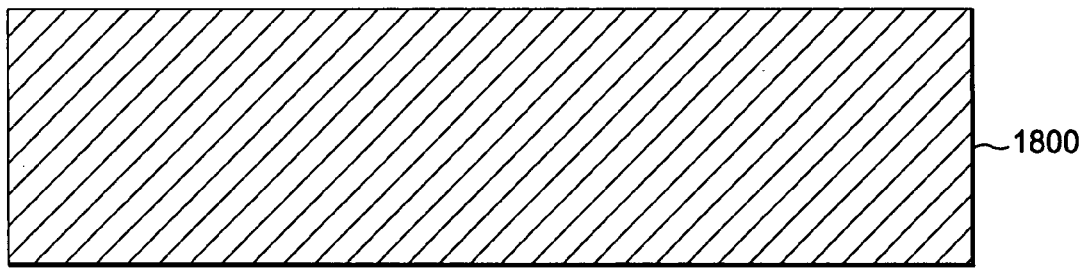
FIGS. 20a to 20e illustrate formation of a structured layer for a component in accordance with an exemplary embodiment of the present invention.
Figure 20B:
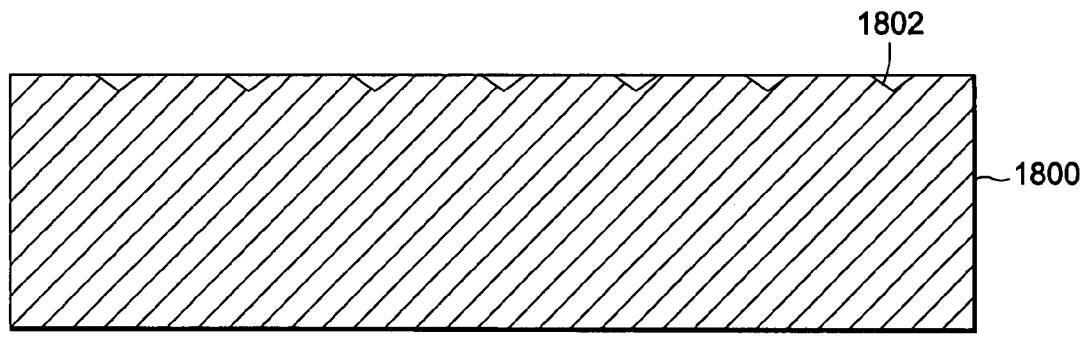
Figure 20C:
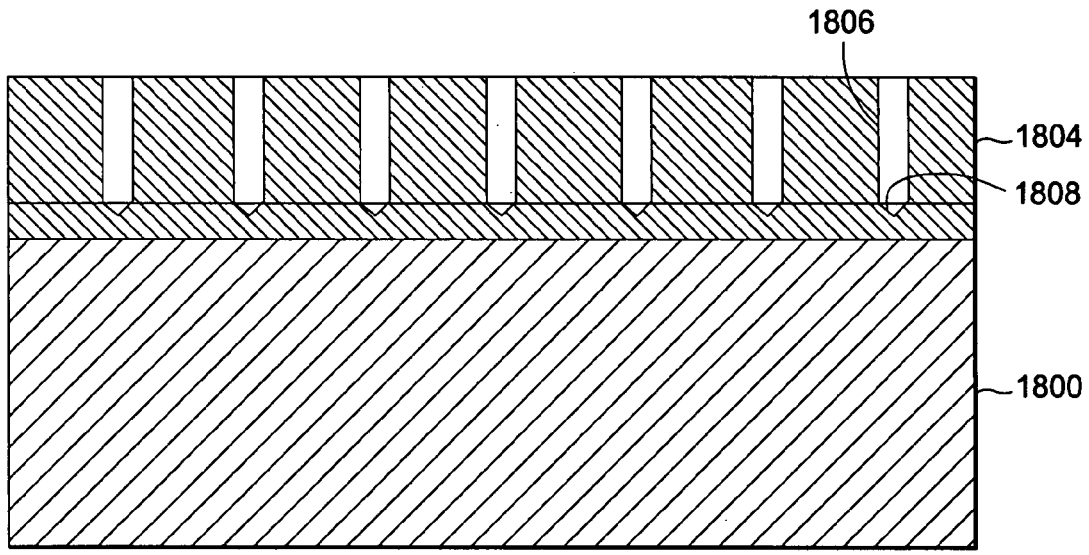

In the manufacturing process, a layer 1800 of substrate material is prepared, as shown in FIG. 20a, and a pattern 1802 is formed on a surface of layer 1800 as shown in FIG. 20b. The pattern may be formed by creating patterned shallow dents on the surface, either by lithography plus an etching process or pressing a mechanical template (e.g. SiC template) against the surface.

During the porous anodizing process, opening 1806s 1806 are formed in a layer 1804 of sacrificial material by partial dissolution of the oxidized sacrificial material at the bottom of the opening 1806s 1808. Dissolution is electrochemically enhanced at the bottom of openings 1808 by a high electric field.

In slightly more detail, a thin barrier oxide of is at the base 1808 of each opening 1806. The opening 1806 geometry concentrates current through the oxide at the opening base 1808. The shortest path between the layer of substrate material 1800 and electrolyte is within this zone, and the field is uniform and at its highest value. Ions move by high field conduction: Al cations reach the opening 1806 surface and pass into solution, and oxide deposition is confined to the metal/oxide interface at the opening base 1808. As aluminum metal is oxidized, the metal/oxide interface moves into the metal. The opening 1806 wall and opening 1806 increase in height, that is, the layer of sacrificial material 1804 thickens, while opening 1806's diameter remains fixed. Because the barrier oxide thickness remains constant, the cell voltage and current remain nearly constant as the, the layer of sacrificial material 1804 thickens.

Because of this constantly propagating barrier at the bottom of each opening 1806, the growth thickness of porous aluminum oxide is virtually infinite with the highest aspect ratio achievable determined by the ratio between the dissolving rate at the bottom of the opening 1806 and at the side wall of the opening 1806.

The opening 1806 density and diameter can either be determined by natural interplays between chemistry and temperature. However, more active control of these physical dimensions can be controlled by the initial pattern forming process.

Figure 20D:
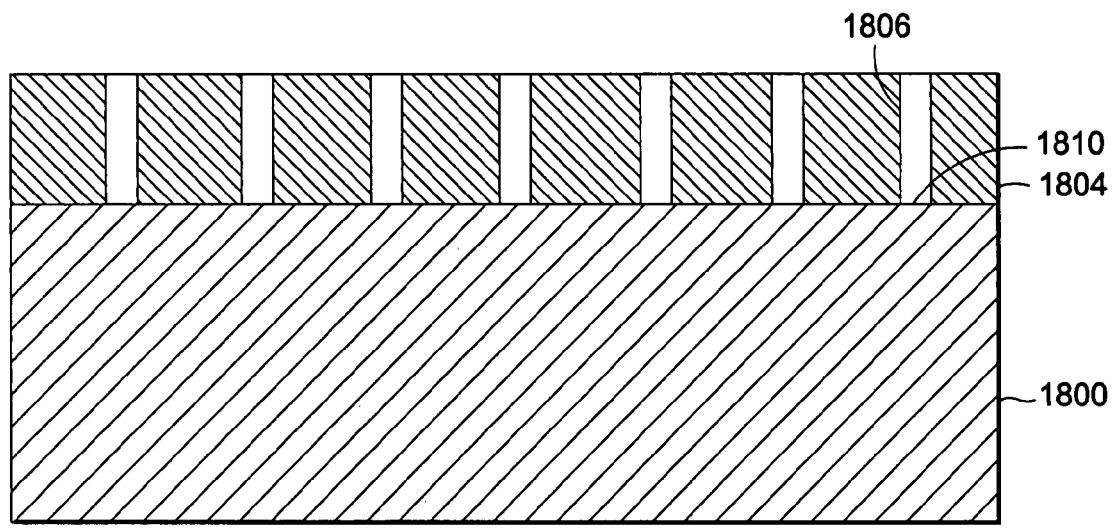

Several processes may be used to remove the bottom layer sacrificial material at the base 1808 of the opening 1806. One process is dipping into a quick wet etch attacking the sacrificial layer. As illustrated in FIG. 20d, this patterns the opening base sacrificial material 1810 to expose the layer of substrate material 1800 and removes some top parts of the sacrificial material as well. Another process is isotropic plasma etching to transfer a pattern vertically into the opening base sacrificial material 1810 where the build up of sacrificial material is located.

Figure 20E:
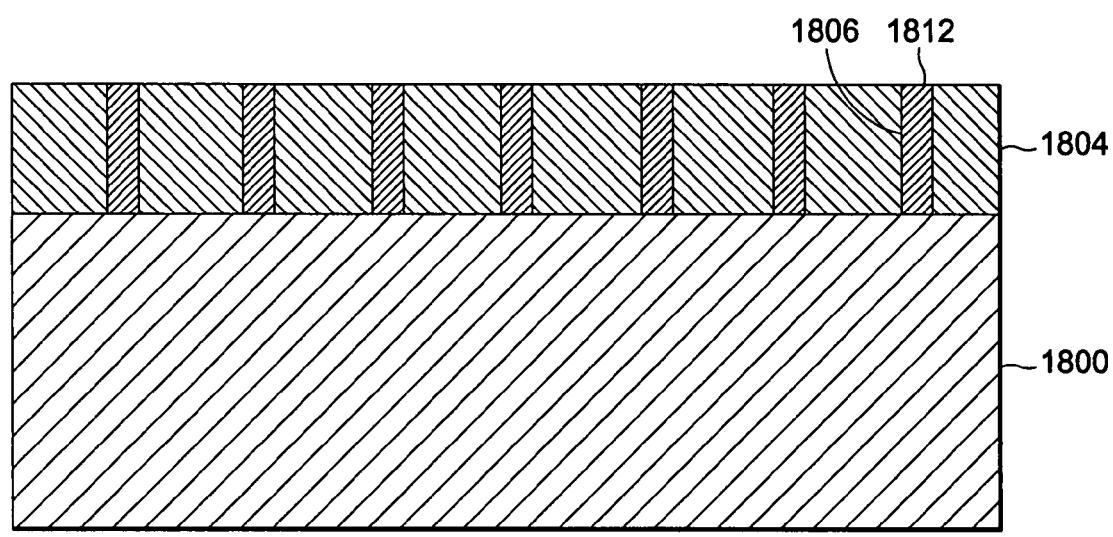

As illustrated in FIG. 20e, as the layer of sacrificial material 1804 is now patterned with openings 1806 that extend to the surface of the layer of substrate material 1800, component structures of transitional material 1812 may now be formed in the pattern, such as by the selective growth processes previously described, and be used as part of a component in an element as previously described.

In one manufacturing process in accordance with an exemplary embodiment of the present invention, the substrate and transitional materials are Al and the sacrificial material is $Al_2O_3$.

Figure 21A:
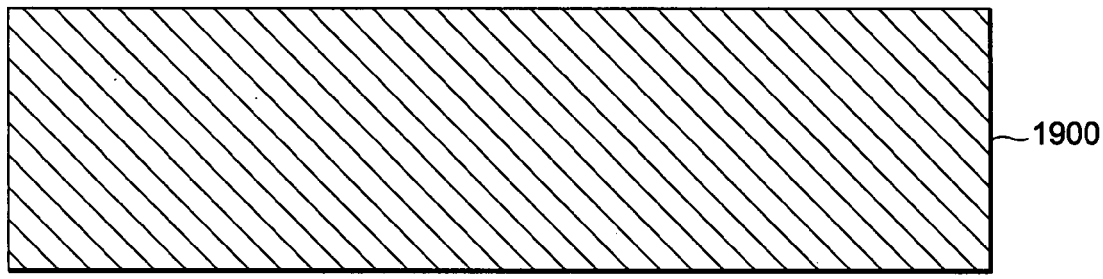
FIGS. 21a to 21i illustrate formation of a structured layer for a component in accordance with an exemplary embodiment of the present invention.

FIGS. 21a to 21i illustrate formation of a structured layer for a component in accordance with an exemplary embodiment of the present invention. In this process, a layer of clean and polished substrate material 1900 is provided as shown in FIG. 21a. In one manufacturing process in accordance with an exemplary embodiment of the present invention, the substrate layer 1900 is a film of Al on a Si substrate.

Figure 21B:
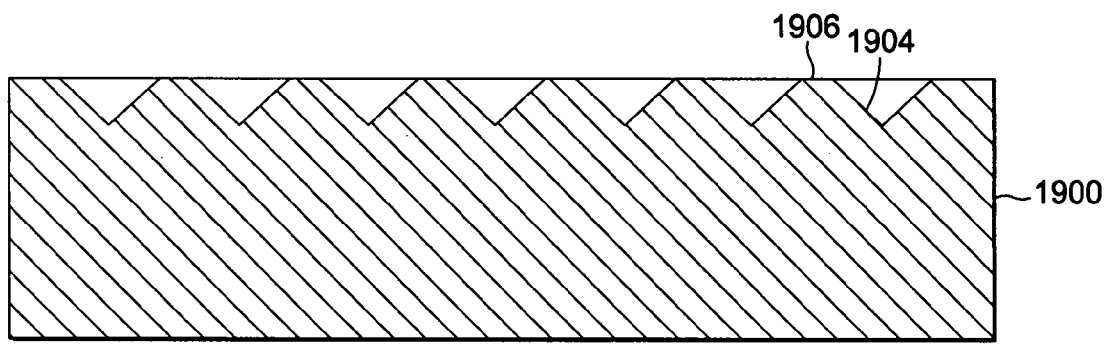
Figure 21C:
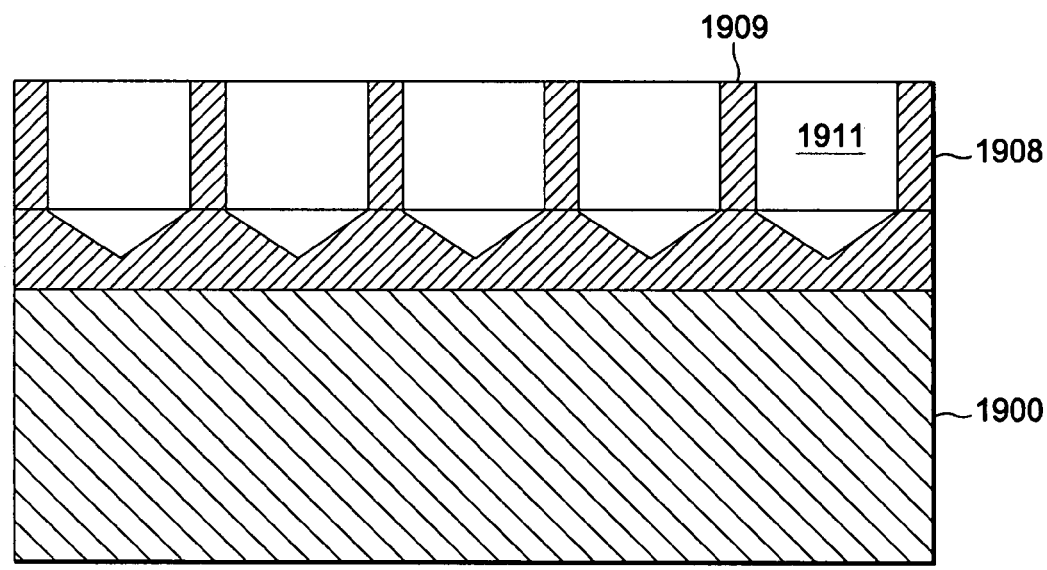

The layer of substrate material 1900 is patterned on a surface using one or more depressions 1904 separated by one or more lands 1906 as shown in FIG. 21b. A width of the depressions 1904 is approximately equal to the spacing between elongated elements in a grating while a width of the lands 1906 is approximately equal to the width of the elongated elements in the grating. The pattern may be created by any suitable process, such as lithography and etching or use of a SiC template pressed against the surface of the layer of substrate material 1900.

Referring now to FIG. 12c, a structure 1908 is grown on the patterned surface of the layer of substrate material 1900 by a porous anodizing process as previously described. This creates a component having one or more spaced apart elongated elements 1909 that are approximately as wide as the lands 1906 of FIG. 21b. In conjunction, a space 1911 between the elongated elements 1909 is approximately as wide as the dents 1904 of FIG. 21b.

Figure 21D:
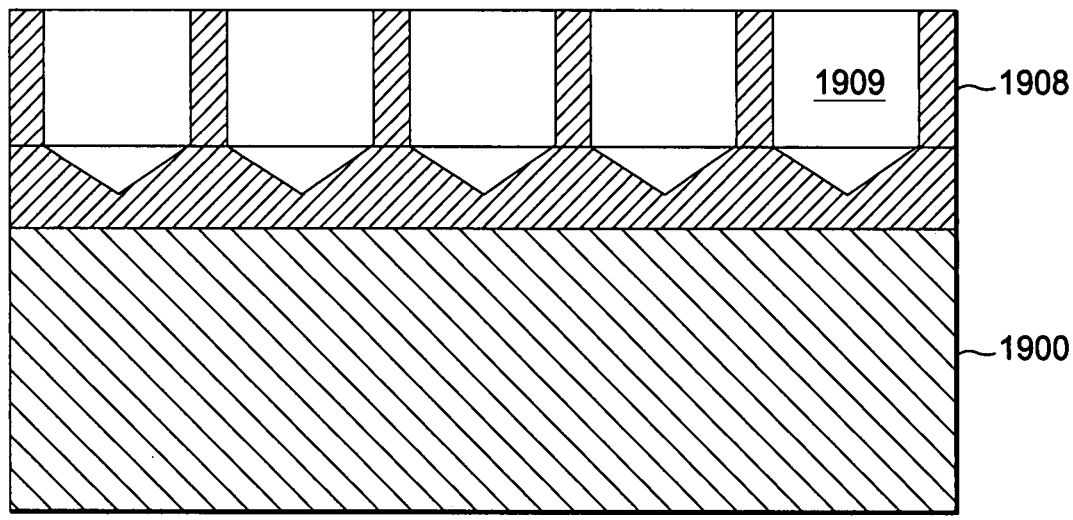
Figure 21E:
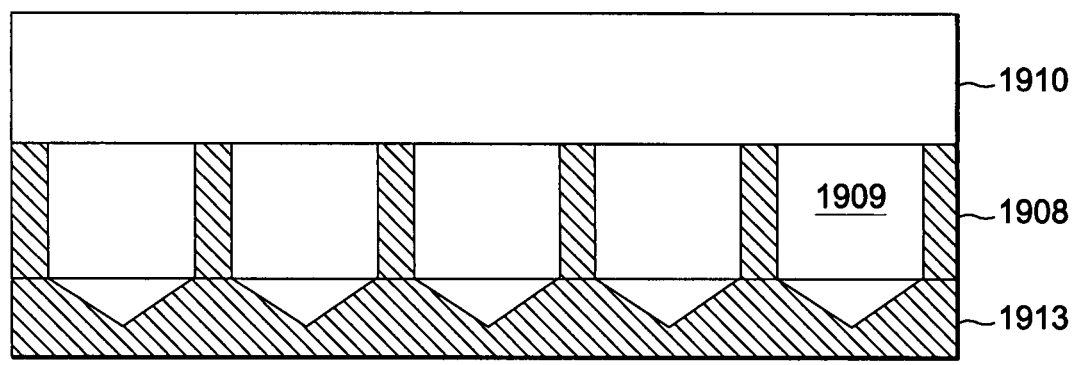

The spaces 1911 are filled in by sacrificial material 1909, such as by a CVD process, and then polished, such as by a CMP process, as illustrated in FIG. 21d. FIG. 21e illustrates removal of the layer of substrate material 1900 (of FIG. 21d) by a process such as grinding and chemical etching. A substrate 1910 is bonded to a surface of the now-filled structure 1908 and a portion 1913 of the structure 1908 is removed by polishing.

Figure 21F:
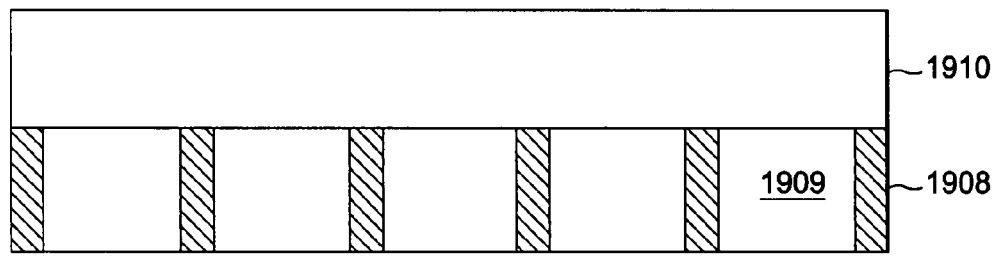
Figure 21G:
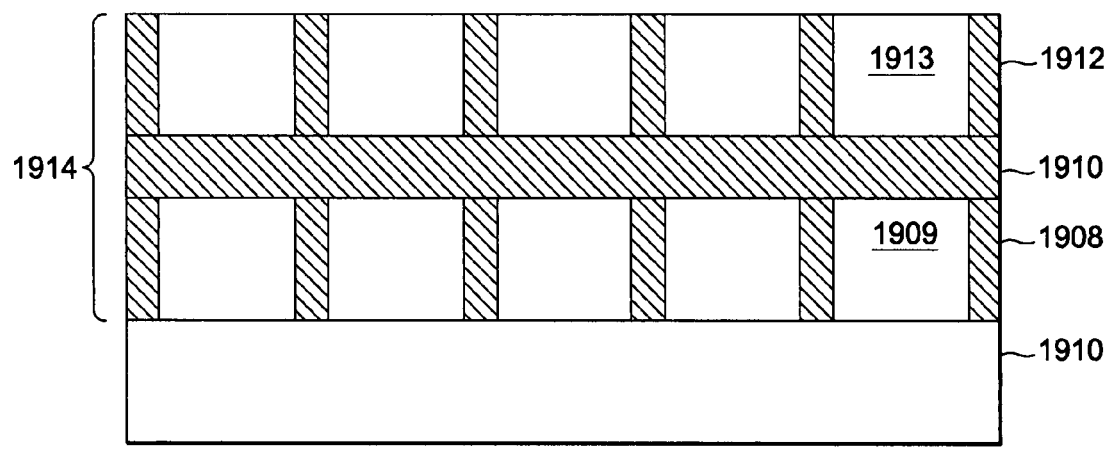

FIG. 21f illustrates the structure 1908 attached to the substrate 1910 and filled with a sacrificial material 1909. Additional structures may then be formed and attached to the structure 1908 to create a component 1914 as shown in FIG. 21g. As an example, component 1914 includes structure 1908 with sacrificial fill 1909, structure 1910, and structure 1912 with sacrificial fill 1913 attached to substrate 1910.

Figure 21H:
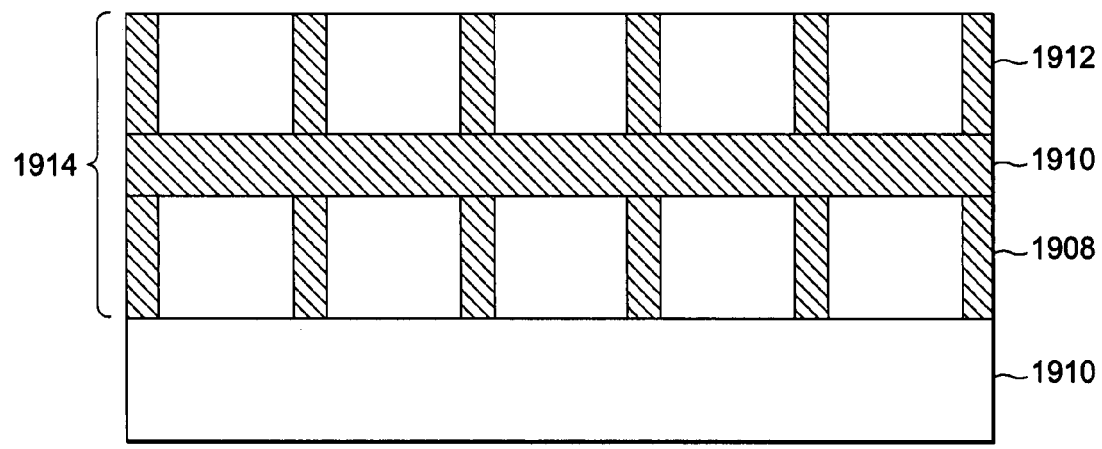
Figure 21I:
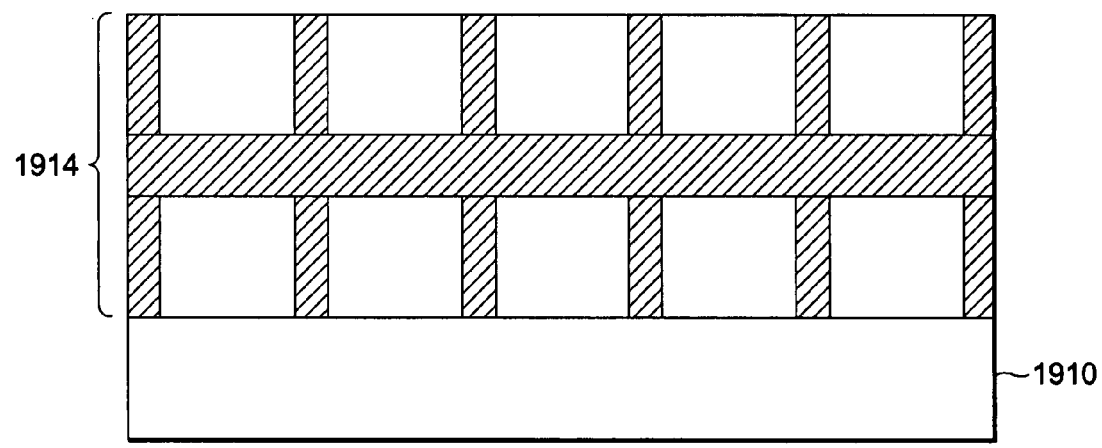

FIG. 21h illustrates removal of sacrificial material using one or more of the sacrificial removal processes previously described. Removal of the sacrificial material leaves the component 1914 attached to the substrate 1910 with structures 1908, 1910 and 1912 without their respective fills of sacrificial material. FIG. 21i 1914 illustrates annealing the component 1914 using one of the processes as previously described, resulting in the component being composed of the final or desired material. The substrate 1910 may then be removed and the component 1914 may be incorporated into an element as previously described.

The present invention has been described above with respect to particular illustrative embodiments. It is understood that the present invention is not limited to the above-described embodiments and that various changes and modifications may be made by those skilled in the relevant art without departing from the spirit and scope of the invention.

What is claimed is:

1. A method of manufacturing a periodic grating structure for a component, comprising:
   forming a first structured layer comprising a first periodic grating structure of a first material and a second material filling spaces between individual features of the first periodic grating structure;
   removing the second material using a first chemical process;
   annealing and simultaneously oxidizing or nitriding the surface of at least a portion of the first material into a third material using a second chemical process;
   forming an isolation layer; and
   forming a second structured layer comprising a second periodic grating structure separated from the first structured layer by the isolation layer.

2. The method of claim 1, wherein the second chemical process is selected from the group consisting of oxidation and nitridation.

3. The method of claim 2, wherein the annealing includes a plasma assist process.

4. The method of claim 1, wherein the isolation layer is made of the second material.

5. The method of claim 1, wherein a nitridation concentration of the first material is lower than a nitridation concentration of the third material.

6. The method of claim 5, wherein the nitride concentration of the third material changes from a surface of the periodic grating structure to a center of the periodic grating structure with the nitride concentration substantially decreasing.

7. The method of claim 1, wherein the first material is Al.

8. The method of claim 7, wherein:
   the third material is AlOxNy with $x \geq 0$, $y \geq 0$; and
   the second chemical process is selected from the group including plasma assisted nitridation and plasma assisted oxidation.

9. The method of claim 1, wherein:
   the first material is Si;
   the third material is SiOxNy with $x \geq 0$, $y \geq 0$; and
   the second chemical process is selected from the group including plasma assisted nitridation and plasma assisted oxidation.

10. The method of claim 1, wherein:
    the first material is ZrO2;
    the third material is ZrOxNy with $x \geq 0$, $y \geq 0$ and $0 \leq x \leq 2$; and
    the second chemical process is selected from the group including plasma assisted nitridation.

11. The method of claim 1, wherein:
    the first material is HfOx1Ny1;
    the third material is HfOx2Ny2 with $(y2/x2) > (y1/x1)$; and
    the second chemical process is selected from the group including plasma assisted nitridation.

12. The method of claim 1, wherein:
    the first material is NbOx1Ny1;
    the third material is NbOx2Ny2 with $(y2/x2) > (y1/x1)$; and
    the second chemical process is selected from the group including plasma assisted nitridation.

13. The method of claim 1, wherein:
    the first material is TiOx1Ny1;
    the third material is TiOx2Ny2 with $(y2/x2) > (y1/x1)$; and
    the second chemical process is selected from the group including plasma assisted nitridation.

14. The method of claim 1, wherein:
    the second material is Si; and
    the first chemical process comprises:
    annealing the Si into SiOx by a plasma assisted oxidation reaction; and etching the SiOx.

15. The method of claim 1, further comprising bonding the structured layer at a surface to a surface of a layer of a fourth material.

16. The method of claim 1, wherein forming the structured layer comprises:
    providing a sacrificial layer of the second material on a layer of substrate material;
    forming a pattern in the sacrificial layer, the pattern comprising one or more openings extending from a surface of the sacrificial layer to the layer of substrate material;
    filling the pattern with the first material; and
    removing the sacrificial layer.

17. A method of manufacturing periodic structures for an optical component, comprising:
    forming a transitional material layer;
    patterning the transitional material layer;
    filling a sacrificial layer in spaces of the patterned transitional material layer;
    flattening a surface of the sacrificial layer and the patterned transitional material layer;
    forming an isolation layer;
    forming a second transitional material layer;
    patterning the second transitional material layer;
    removing the first and second sacrificial layers using a first chemical process; and
    annealing and simultaneously oxidizing or nitriding the surface of a part of transitional material in the component to a final material using a second chemical process.

18. A method of manufacturing an optical component having a plurality of periodically structured layers, including:
    putting a plurality of structured layers of a transitional material on a transparent substrate with at least two of the structured layers separated by an isolation layer;
    bonding the plurality of structured layers to the transparent substrate; and
    annealing and simultaneously oxidizing or nitriding the surface of the transitional material of the structured layers into a final material.

* * * * *